United States Patent
Hanakawa et al.

(10) Patent No.: US 6,474,726 B1
(45) Date of Patent: Nov. 5, 2002

(54) AUTOMOBILE BODYSHELL FRAME STRUCTURE

(75) Inventors: Katsunori Hanakawa; Mitsugi Fukahori; Kyousou Ishida; Yukio Yamamoto; Motoyasu Asakawa, all of Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/633,106

(22) Filed: Aug. 4, 2000

(30) Foreign Application Priority Data

Aug. 5, 1999 (JP) ............ 11-222829
Aug. 5, 1999 (JP) ............ 11-222845

(51) Int. Cl.[7] .............................. B60R 22/28
(52) U.S. Cl. ............. 296/191; 296/203.01; 296/203.03; 296/188
(58) Field of Search ............... 296/188, 189, 296/191, 203.01, 205, 203.02, 203.03, 203.04

(56) References Cited

U.S. PATENT DOCUMENTS

| | | | | |
|---|---|---|---|---|
| 5,575,526 A | * | 11/1996 | Wycech | 296/205 |
| 5,806,919 A | * | 9/1998 | Davies | 296/205 |
| 5,884,960 A | | 3/1999 | Wycech | |
| 5,992,923 A | | 11/1999 | Wycech | |
| 6,003,274 A | * | 12/1999 | Wycech | 296/188 |
| 6,079,180 A | * | 6/2000 | Wycech | 296/205 |
| 6,096,403 A | * | 8/2000 | Wycech | 296/188 |
| 6,165,588 A | * | 12/2000 | Wycech | 296/205 |

FOREIGN PATENT DOCUMENTS

| | | |
|---|---|---|
| DE | 197 20 109 | 11/1997 |
| EP | 0 775 721 | 5/1997 |
| JP | 58139878 | 8/1983 |
| JP | 63231913 | 9/1988 |
| JP | 1-125278 | 8/1989 |
| JP | 6-156317 | 6/1994 |
| JP | 6-61659 | 8/1994 |

OTHER PUBLICATIONS

European Search Report, Application Ser. No. 00116780.8–2421 Date: Mar. 17, 2002.

* cited by examiner

*Primary Examiner*—Joseph H. Pape
*Assistant Examiner*—Greg Blankenship
(74) *Attorney, Agent, or Firm*—Nixon Peabody LLP; Donald R. Studebaker

(57) ABSTRACT

An automobile bodyshell frame structure includes a generally elongated first panel member, and a generally elongated second panel member having opposite side edge portions connected to the first panel member to define a hollow between the first and second panel members. A filler is disposed within a portion of a cross-section of the hollow between the first and second panel members. This filler is provided on an inner surface of one of the first and second panel members and has an average compressive strength equal to or greater than 4 Pa and/or a maximum bending strength equal to or greater than 10 MPa.

17 Claims, 19 Drawing Sheets

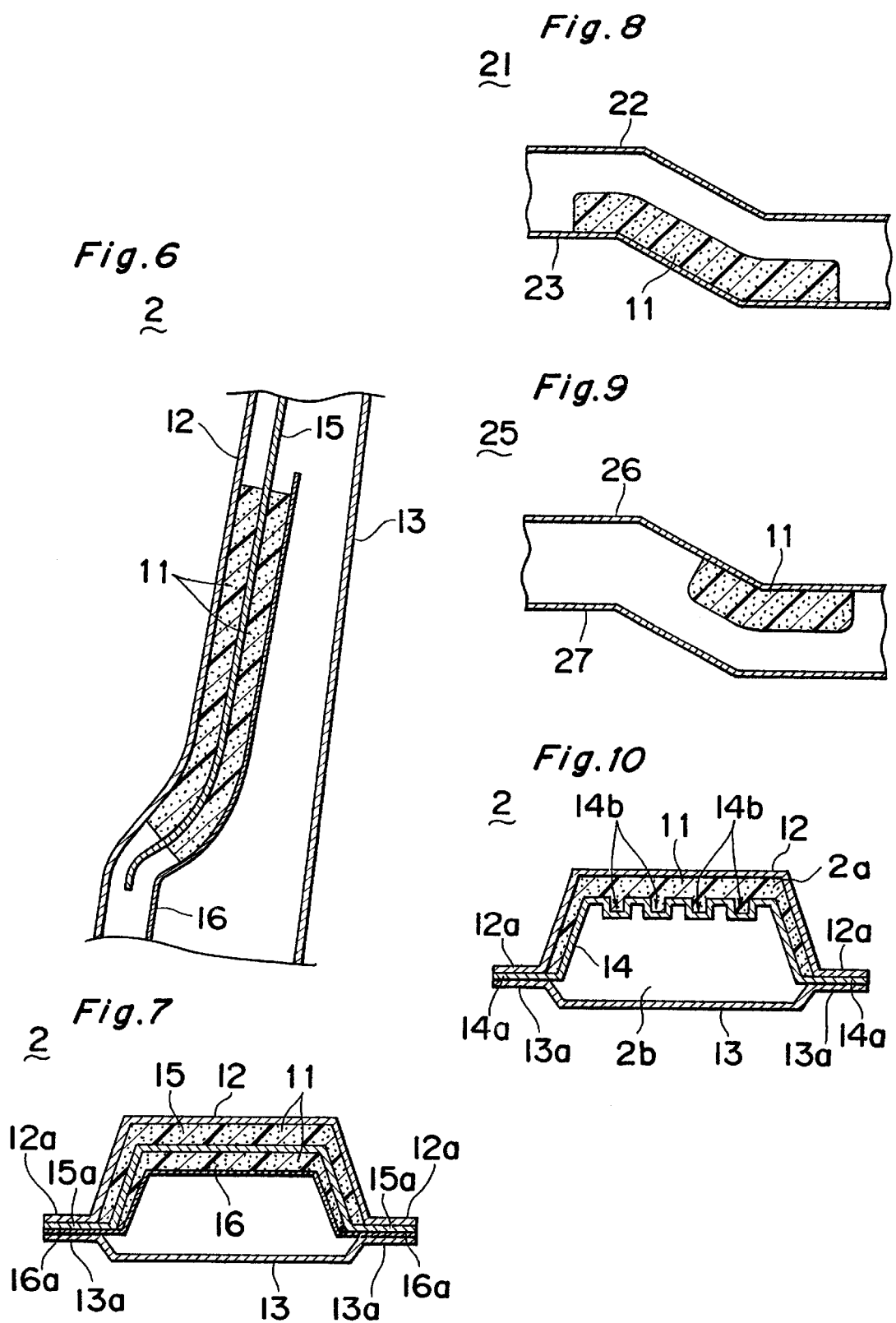

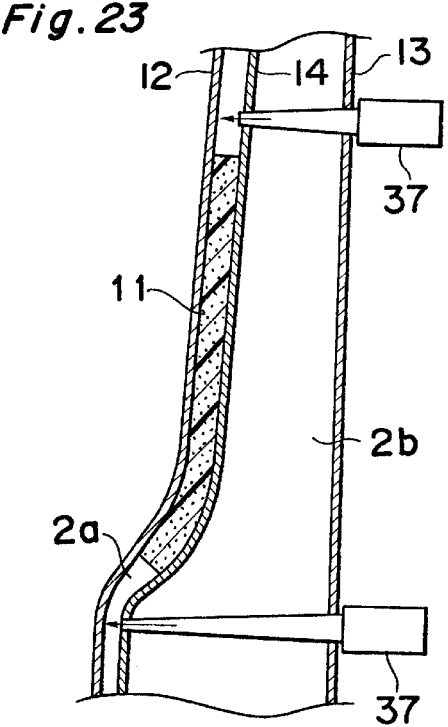
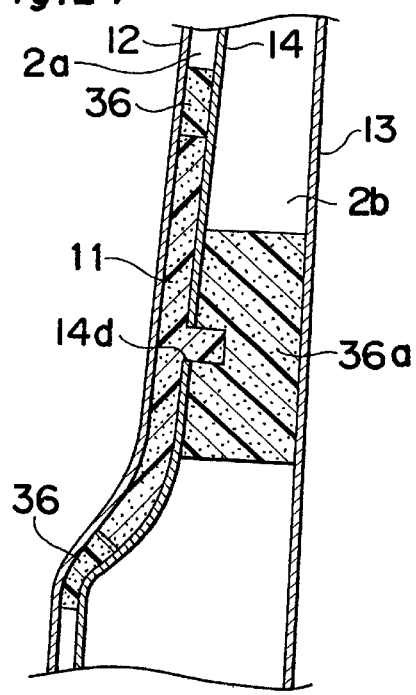
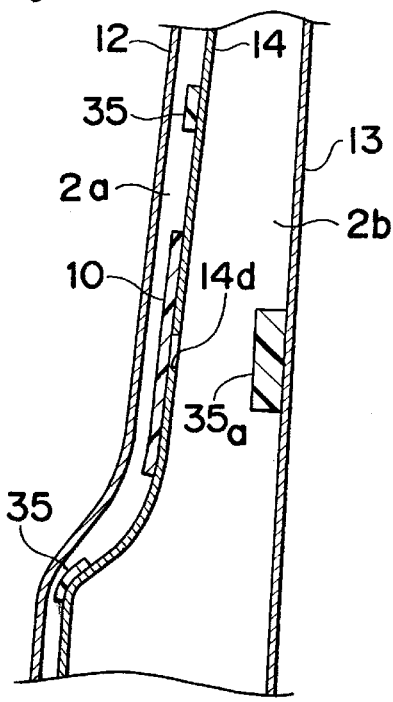
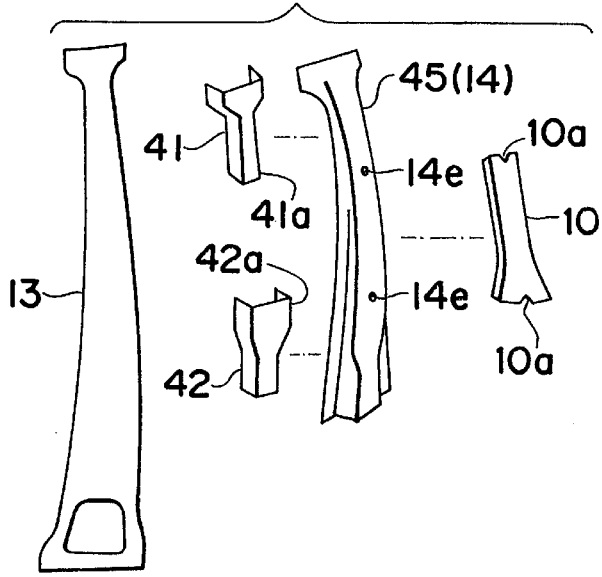

AUTOMOBILE BODYSHELL FRAME STRUCTURE

BACKGROUND OF THE INVENTION

1. Field of the Invention

The present invention generally relates to an automobile bodyshell and, more particularly, to a bodyshell frame structure employed therein although not limited thereto.

2. Description of the Prior Art

The frame structure of the type referred to above is used for, for example, side center pillars of the automobile bodyshell. As is well know to those skilled in the art, the side center pillar comprises elongated outer and inner panels welded together along their side flanges to define a hollow of a closed- box section. At least a portion of, the side center pillar where a strength and a rigidity are particularly required, a reinforcement or intermediate panel is interposed between the outer and inner panels. In this type of the frame structure, in order to increase the strength, rigidity and impact energy absorption, various attempts are employed, for example, to employ panels of an increased thickness and/or additional reinforcements, The Japanese Laid-open Utility Model Publication No. 1-125278 discloses the use of the frame structure of the type discussed above for each of side front pillars of the automobile bodyshell. According to this publication, each side front pillar includes an upper pillar section and a lower pillar section connected at one end with the upper pillar section. Each of the upper and lower pillar sections is comprised of outer and inner panels welded together to define a hollow of a generally closed-box section. However, at a joint between the upper and lower pillar sections, a brace is provided so as to intervene between the upper and lower panels, thereby dividing the hollow of the frame structure into closed outer and inner volumes.

To suppress transmission of vibratory noises to a passengers' compartment and also to increase the absorption of energies generated in the event of an automobile collision, the publication referred to above discloses the use of an expandable filling material such as, for example, an expandable urethane resin, which fills up completely within the hollow in an upper region of the upper pillar section and, also fills up partially within the hollow in a lower region of the upper pillar section and an upper region of the lower pillar section, that is, only within the closed outer volume delimited between the outer panel and the brace.

Also, according to the above referenced publication, the expandable filling material is injected externally into the hollow in the frame structure by means of a filling gun and expands to fill up the requisite hollow as it is injected thereinto.

Considering that in recent years demand for increase of the mileage of an automobile is pressing, the automobile bodyshell has to be reduced in weight to meet the demand. However, the use of the panels and/or reinforcements of an increased thickness is ineffective to reduce the weight of the automobile bodyshell and also to increase both the mileage and the safety against automobile collision.

Accordingly, the use may be contemplated of the filler such as, for example, a lightweight expandable urethane resin within the hollow of the frame structure so that not only can increase of the weight of the automobile bodyshell be minimized, but also the safety factor against automobile collision can be increased.

The filler made of the expandable urethane resin has a high capability of deforming to a certain extent when a load acts thereon as a result of automobile collision and, accordingly, the filler employed in the form of the expandable urethane resin has such a problem that since an impact load will hardly be transmitted from the point of application thereof in all directions outwardly towards the surroundings through the panels with the frame structure consequently considerably deformed at a local portion adjacent the point of application of the impact load, the energy absorption of the frame structure cannot be increased satisfactorily. Although in terms of the lightweight feature the filler is preferably disposed within a portion of the cross-section of the hollow of the frame structure, not within the entire cross-section of the hollow of the frame structure, the disposition of the filler having a high capability of deforming such as described above within a portion of the cross-section of the hollow of the frame structure is ineffective to increase the energy absorbing power even though effective to reduce the vibrations and noises.

SUMMARY OF THE INVENTION

Accordingly, the present invention has been devised to provide an improved automobile bodyshell frame structure, wherein characteristics of material for the filler are carefully chosen to enable the automobile bodyshell to employ a minimized amount of the filler to accomplish the reduction in weight of the automobile bodyshell and also to increase the safety factor against automobile collision.

To accomplish this and other objects and features of the present invention, there is in accordance with the present invention provided an automobile bodyshell frame structure including a generally elongated first panel member, and a generally elongated second panel member having opposite side edge portions connected to the first panel member to define a hollow between the first and second panel members. A filler is disposed within a portion of a cross-section of the hollow between the first and second panel members. This filler is provided on an inner surface of one of the first and second panel members and has an average compressive strength equal to or greater than 4 MPa and/or a maximum bending strength equal to or greater than 10 MPa.

According to the; present invention, the filler is disposed on a portion (a buckling portion) of the panel members which will be deformed to buckle inwardly of the frame structure when an impact load is applied thereto and, therefore, a force acting locally on that portion can be dispersed outwardly through the filler. Accordingly, it is possible to allow that portion of the panel member to effectively absorb impact energies by suppressing any possible bending of that portion and facilitating bending of that portion.

As hereinabove described, the filler has an average compressive strength, as defined later, which is equal to or greater than 4 MPa and/or a maximum bending strength equal to or greater than 10 MPa. This is because, although the energy absorption of the frame structure will increase with increase of the average compressive strength or the maximum bending strength of the filler, the extent of increase, of the energy absorption will saturate if the average compressive strength or the maximum bending strength exceeds 4 MPa or 10 MPa, respectively.

In other words, if the average compressive strength is equal to or greater than 4 MPa, a localized deformation of the frame structure which will lead to collapse of the frame structure can advantageously be minimized. Also, if the maximum bending strength is equal to or greater than 10 MPa, any possible cracking of the filler can advantageously be suppressed to thereby suppress a brittle fracture of the frame structure to a maximum possible extent even though the frame structure is considerably deformed locally. Consequently, if the filler satisfying one or both of the characteristics discussed above is employed, the energy absorption about equal to the maximum value can be obtained and, even though the filler is disposed partially within the frame structure, the safety factor against collision can advantageously increased.

Accordingly, the present invention does not require the use of panel members having an increased thickness for increasing the energy absorption and suffices to use the lightweight filler such as, for example, an expandable filling material made of epoxy resin in particular to accomplish reduction in weight of the automobile bodyshell and to increase the mileage.

In another aspect of the present invention, there is also provided an automobile bodyshell frame structure, which includes a generally elongated first panel member, a generally elongated second panel member having opposite side edge portions connected to the first panel member to define a hollow between the first and second panel members, and an intermediate panel member interposed between the first and second panel members so as to divide the hollow into a first closed volume adjacent the first panel member and a second closed volume adjacent the second panel member. Upper and lower dividing elements are positioned on one of opposite surfaces of the intermediate panel member adjacent the first closed volume and spaced a distance from each other in a direction lengthwise of the frame structure, each of said dividing elements defining a respective gap between it and the first panel member. The filler is expanded to fill up a portion of the first closed volume that is delimited between the upper and lower dividing elements with end portions of the filler filling up the gaps between the upper and lower dividing elements and the first panel member. This filler when not expanded yet being retained in that portion of the first closed volume delimited between the upper and lower dividing elements.

In a further aspect of the present invention, there is also provided an automobile bodyshell frame structure, which includes a generally elongated first panel member, a generally elongated second panel member having opposite side edge portions connected to the first panel member to define a hollow between the first and second panel members, and an intermediate panel member interposed between the first and second panel members so as to divide the hollow into a first closed volume adjacent the first panel member and a second closed volume adjacent the second panel member. A first filler is expanded to fill up at least a portion of the first closed volume and having ends opposite to each other, and a second filler expanded within that portion of the first closed volume and held in abutment with each of the opposite ends of the first filler.

BRIEF DESCRIPTION OF THE DRAWINGS

The present invention will become readily understood from the following description of preferred embodiments thereof made with reference to the accompanying drawings, in which like parts are designated by like reference numeral and in which:

FIG. 6 is a fragmentary longitudinal sectional view of a modified form of the side center pillar shown in FIG. 2;

FIG. 7 is a transverse sectional view of the modified side center pillar shown in FIG. 6;

FIG. 8 is a schematic longitudinal sectional view of one of front side frames of the automobile bodyshell, showing the filler filled in the front side frame;

FIG. 9 is a schematic longitudinal sectional view of one of rear side frames of the automobile bodyshell, showing the filler filled in the rear side frame;

FIG. 10 is a transverse sectional view of the side center pillar according to a second preferred embodiment of the present invention;

FIG. 23 is a view similar to FIG. 21, showing formation of second fillers by the use of filling guns;

FIG. 24 is a fragmentary longitudinal sectional view of the side center pillar, showing the use of a second filler to prevent a portion of the first filler from cracking where a reinforcement or intermediate panel employed in the side center pillar of FIGS. 21 has a perforation defined therein;

FIG. 25 is a view similar to FIG. 24, showing the side center pillar before sheets of filling material are expanded to form the first and second fillers;

FIG. 26 is a schematic exploded view of the side center pillar according to a fifth preferred embodiment of the present invention;

DESCRIPTION OF THE EMBODIMENTS

In describing some preferred embodiments of the present invention, relative terms "front", "rear", "left" (nearside) and "right" (offside) are used in conjunction with respective positions, components or parts of an automobile body structure. These terms are herein used relative to the direction of forward rum of an automotive vehicle as viewed from a vehicle driver occupying a driver's seat. Similarly, the terms "upward" or "upper" and "downward" or "lower" are used relative to the ground surface or any other support surface on which the automobile body structure rests supported.

First Embodiment (FIGS. 1 to 9)

Figure 1:
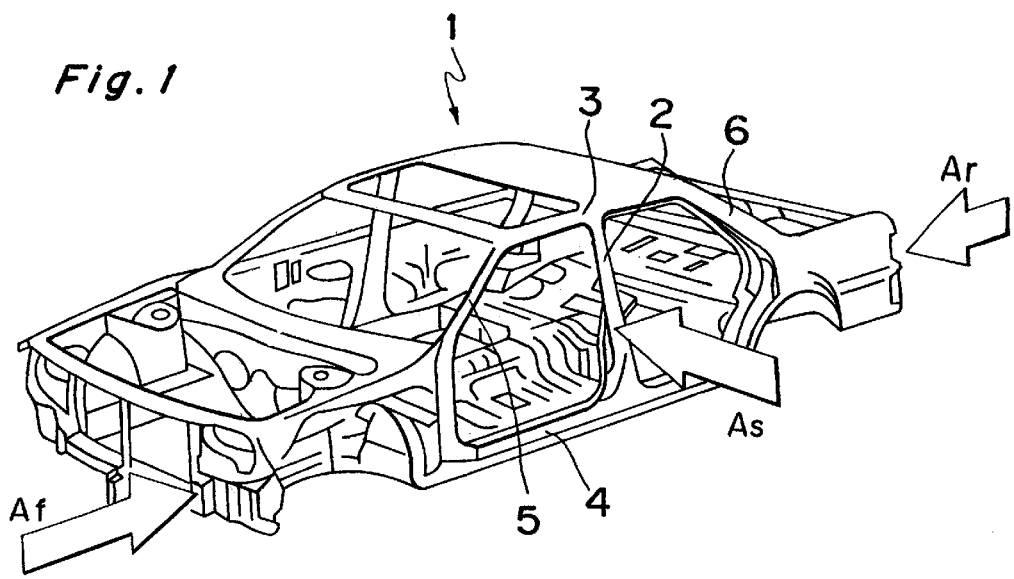
FIG. 1 is a schematic perspective view of an automobile bodyshell to which, although not exclusively limited thereto, the present invention is applicable.

Referring first to FIG. 1, there is shown an automobile bodyshell 1 built on, for example, the monocoque bodywork principle. The illustrated automobile bodyshell 1 includes left and right side center pillars 2 each extending generally vertically and positioned on respective sides of front and rear side doors (not shown); left and right longitudinal roof side rails 3 each extending generally in a direction parallel to the longitudinal sense of the automobile bodyshell 1 and having a generally intermediate portion connected with a top end of the respective side center pillar 2; left and right longitudinal side sills 4 each extending on a respective side of a roof panel structure generally in a direction parallel to the longitudinal sense of the automobile bodyshell 1 and having a generally intermediate portion connected with a bottom end of the respective side center pillar 2; left and right front side pillars 5 each having top and bottom ends connected with respective front ends of the corresponding longitudinal roof side rail 3 and longitudinal side sill 4 and left and right rear side pillars 6 each having top and bottom ends connected with respective rear ends of the corresponding longitudinal roof side rail 3 and longitudinal side sill 4.

All of those bodyshell segments 2 to 6 may be in the form of a generally closed-box section frame structure. In addition to those bodyshell segments 2 to 6, the automobile bodyshell 1 makes use of a number of frame structures in various parts of the automobile bodyshell 1 such as, for example, crossbars connecting the left and right longitudinal roof side rails 3 together and the left and right longitudinal side sills 4 together, braces, an impact bumper, and so on. Accordingly, although in the description that follows, reference will be made to one of the side center pillars 2 for the purpose of facilitating better and quick understanding of the present invention, those skilled in the art will, upon reading of the disclosure herein made, readily understand that the present invention can be equally applied to any frame structure other than those enumerated in conjunction with the automobile bodyshell.

Figure 2:
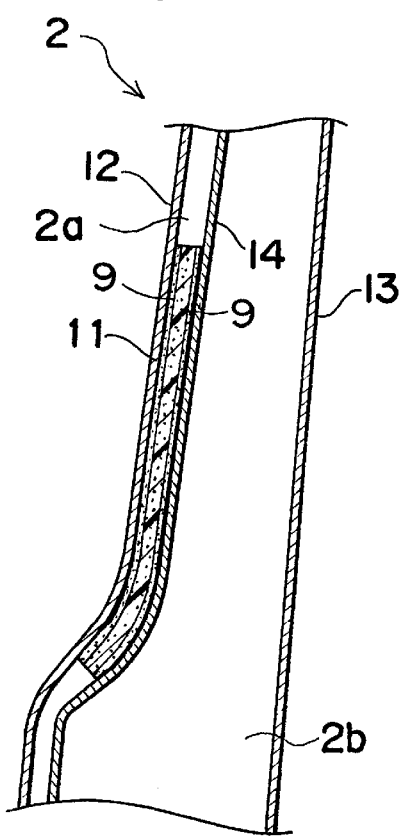
FIG. 2 is a fragmentary longitudinal sectional view showing one of opposite side center pillars of the automobile bodyshell according to a first preferred embodiment of the present invention.
Figure 3:
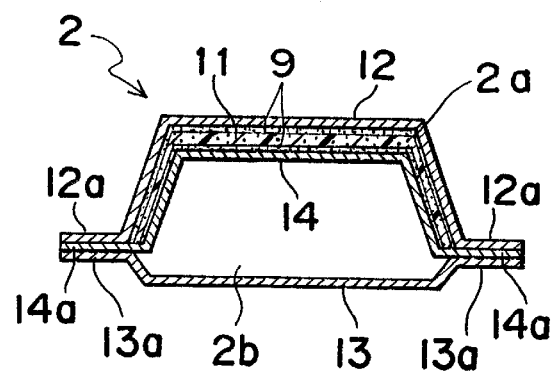
FIG. 3 is a transverse sectional view of the side center pillar shown in FIG. 2.

Referring now to FIGS. 2 and 3, the side center pillar 2, shown in a fragmentary longitudinal sectional view as viewed in a direction conforming to the longitudinal sense of the automobile bodyshell 1, has a foamed filler 11 disposed within the hollow of the side center pillar 2 at a region aligned with or adjacent a belt line or generally intermediate of the height of the automobile bodyshell 1. The foamed filler 11 serves to minimize the possibility of that belt-line region of the side center pillar 2 being buckled inwardly into a passengers' compartment in the event of application of an impact load acting in a direction shown by the arrow As in FIG. 1 as a result of, for example, an automobile side collision.

More specifically, the side center pillar 2 includes a generally channel-sectioned outer panel 12 having laterally outwardly protruding side flanges 12a, a generally channel-sectioned inner panel 13 having laterally outwardly protruding side flanges 13a and a similarly channel-sectioned s reinforcement or intermediate panel 14 having laterally outwardly protruding side flanges 14a. These outer, inner and intermediate panels 12 to 14 may be prepared from a steel plate by the use of any known press work and are integrated together to define the side center pillar 2 with the side flanges 12a to 14a spot-welded together in any known manner. In the assembled condition as best shown in FIG. 3, the outer land intermediate panels 12 and 14 extend generally parallel to each other and protrude in a direction away from the passengers' compartment of the automobile bodyshell 1, whereas the inner panel 13 protrudes in a direction opposite to the direction of protrusion of the outer and intermediate panels 12 and 14 and inwardly of the passengers' compartment.

The outer and inner panels 12 and 13, with their respective side flanges 12a and 13a spot-welded together, render the cross-section of the resultant side center pillar 2 to represent the shape of a generally closed box which is divided by the intermediate panel 14, having its side flanges 14a intervening the side flanges 12a and 13a, into a generally closed outer volume 2a adjacent the outer panel 12 and a generally closed inner volume 2b adjacent the inner panel 13. As clearly shown in FIG. 3, the outer and intermediate panels 12 and 14 are spaced la smaller distance than that between the intermediate and inner panels 14 and 13 since the outer and intermediate panels 12 and 14 protrude in the same direction laterally outwardly of the passengers' compartment whereas the inner, panel 13 protrude laterally inwardly of the passengers' compartment substantially as described above.

As hereinabove described, the foamed filler 11 is disposed having been foamed within closed outer volume 2a in the side center pillar 2 at the region aligned with or adjacent the belt line that extends longitudinally of the automobile bodyshell 1 at a level generally intermediate of the height of the automobile bodyshell 1. The region of the side center pillar 2 where the foamed filler 11 is positioned may be where the maximum possible impact load As would be applied to the automobile bodyshell 11 at the time of, for example, an automobile side collision. The reason that the foamed filler 11 is disposed so as to fill up the closed outer volume 2a, not the entire volume within the side center pillar 2, is because when the impact load As shown in FIG. 1 acts externally on the side center pillar 2a bending moment is developed in the side center pillar 2 with a compressive force consequently induced in an outer side portion of the side center pillar 11 with respect to a neutral axis of the side center pillar 11 rather than in an inner side portion of the side center pillar 11. In other words, since the outer side portion of the side center pillar 11 on one side of the neutral axis of the side center pillar 11 is more susceptible to the compressive force resulting from the bending moment that is developed as a result of the impact load As than the inner side portion of the side center pillar 11 on the opposite side of the neutral axis thereof, the foamed filler 11 is disposed within that portion of the closed outer volume 2a and 2b delimited between the outer and intermediate panels 12 and 14.

When viewed in al direction transverse to the longitudinal sense of the side center pillar 11, the foamed filler 11 within the closed outer volume 2a represents a generally U-shaped configuration conforming to the sectional representation of the closed outer volume 2a as clearly shown in FIG. 3.

The filler 11 employed in the practice of the present invention may be made of, for example, an expandable or non-expandable epoxy resin and preferably has an average compressive strength not smaller than 4 MPa and more preferably not smaller than 5 MPa and a maximum bending strength not smaller than 10 MPa and more preferably not smaller than 60 MPa. If the average compressive strength is not smaller than 4 MPa, any possible inward collapse of the belt-line region of the side center pillar 2 following deformation thereof that may be brought about, by the application of the impact load As can advantageously be suppressed to a maximum possible extent. If the maximum bending strength is not smaller than 10 MPa, any possible cracking of the filler 11 can advantageously be suppressed, even if the side center pillar 11 is considerably deformed locally, to thereby suppress a brittle fracture of the side center pillar 2 to a maximum possible extent. Accordingly, those cumulative effects can be obtained settledly if ;the filler 11 has both an average compressive strength not smaller than 5 MPa and a maximum bending strength not smaller than 60 MPa.

Figure 39:
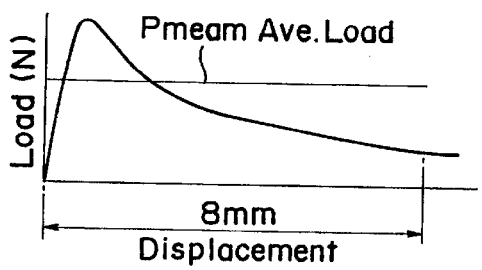
FIG. 39 is a graph showing the static compressive load versus displacement characteristic of a frame structure that is used to explain the average compressive strength of the filler.

It is to be noted that the average compressive strength referred to above is an average value of the compressive load required for a cube, 30×30×30 mm in volume, of the filler 11 to be inwardly compressed a displacement (the amount of the filler cube having been compressed) within the range of 0 to 8 mm when the compressive load is applied in one direction to the filler cube at a rate of 10 mm/min, as shown in FIG. 39.

Figure 4A:
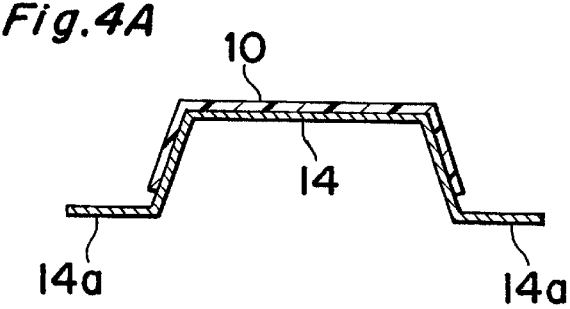
FIGS. 4A to 4C are schematic transverse sectional views showing the manner in which the side center pillar is assembled with a filler filled therein.
Figure 4B:
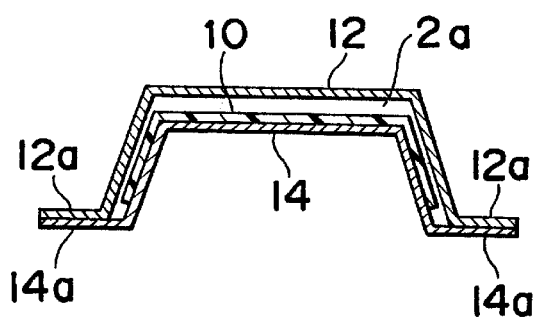
Figure 4C:
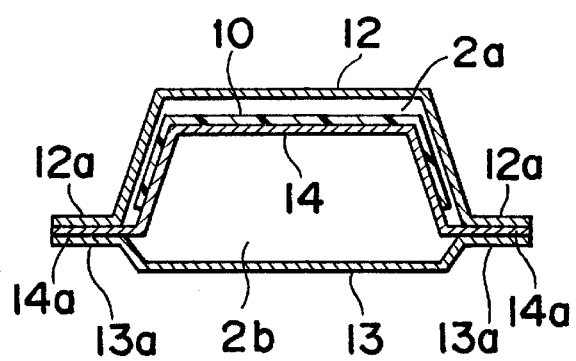

The manner of assembling the side center pillar 2 of the structure described above will now be described. In the first place, as shown in FIG. 4A, a sheet 10 of unexpanded filler material, which will eventually form the filler 11, is applied to an outer surface of the reinforcement or intermediate panel 14, except for the flanges 14a, that will face the outer panel 12. The outer panel 12 is subsequently connected to the intermediate panel 14 with their flanges 12a and 14a spot-welded together, so as to enclose the filler sheet 10 within the closed outer volume 2a as shown in FIG. 4B. Thereafter, as shown in FIG. 4C, the inner panel 13 is connected to the intermediate panel 14 with their flanges 13a and 14a spot-welded together, so as to leave the closed inner volume 2b between the intermediate panel 14 and the inner panel 13, thereby completing the side center pillar 2.

The automobile bodyshell 1 is assembled using, inter alia, the side center pillars 2 of the structure described above. After the automobile bodyshell 1 has been completed, the bodyshell 1 is dipped in an electrophoretic paint bath to apply an electrophoretic paint to the bodyshell 1. After the dipping process, the automobile bodyshell 1 is conveyed through a furnace heated to 180° C. so as to travel therethrough in about 35 minutes, that is, heated at 180° C. for 35 minutes, to dry the electrophoretic paint. During the transport of the automobile bodyshell 1 through the furnace, the side center pillars 2 are heated to a minimum temperature of about 150° C.

After the electrophoretic paint has been dried, the bodyshell 1 is applied a paint sealer and is then heated at 140° C. for 20 minutes to dry the applied paint sealer. At this time, the side center pillars 2 are heated to a temperature of about 100° C. After the paint sealer has been dried, an intermediate coating is carried with the bodyshell 1 heated at 140° C. for 40 minutes to dry the intermediate coating, followed by a finish coating with the bodyshell 1 again heated at 140° C. for 40 minutes to dry the finish coating. During the drying of the intermediate coating, the side center pillars 2 are heated at 140° C. for 20 minutes and, similarly, during the drying of the finish coating, the center pillars 2 are heated at 140° C. for 20 minutes.

During the drying of the electrophoretic paint the filler sheet 10 is heated to expand to completely fill up the closed outer volume 2a. Since the filler sheet 10 is foamed and cured by the effect of hear used to dry the electrophoretic paint applied to the bodyshell 1, no extra process station to cause the filler sheet 10 to expand is needed, accompanied by increase in productivity.

It is to be noted that the filler sheet 10 is expanded and is cured by approximately half during the drying of the electrophoretic paint, and is completely cured during the drying of the intermediate and finish coatings. It is also to be noted that during the drying of the paint sealer, the temperature of the side center pillars 2 is too low for the filler sheet 10 to virtually cure.

Figure 5A:
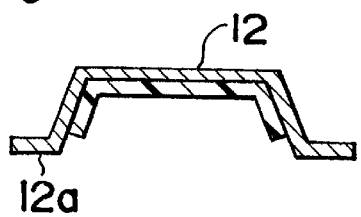
FIGS. 5A to 5C are views similar to FIGS. 4A to 4C, respectively, showing a modified method of assembling the side center pillar.
Figure 5B:
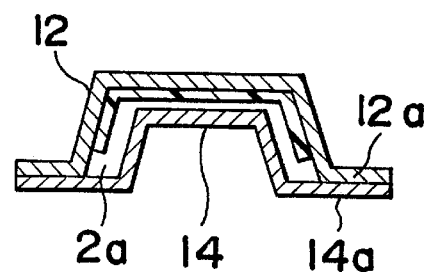
Figure 5C:
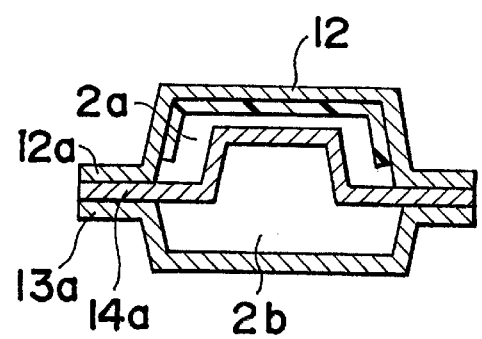

In the foregoing embodiment of the present invention described particularly with reference to FIGS. 4A to 4C, the filler sheet 10 has been applied to the intermediate panel 14 prior to the outer panel 12 being spot-welded to the intermediate panel 14. However, as shown in FIGS. 5A to 5C showing sequential process steps corresponding to those shown in FIGS. 4A to 4C, the filler sheet 10 may be applied to an, inner surface of the outer panel 12, except for the flanges 14a, that will face the intermediate panel 14.

Hereinafter, the manner in which the side center pillar 2 with the filler 11 accommodated therein works will be described. As is well known to those skilled in the art, when the impact load As is applied to the side center pillar 2 at the time of, for example, an automobile side collision, a relatively large local force acts on the region of the outer panel 12 generally aligned with the belt line of the automobile bodyshell 1, causing it to be inwardly buckled to protrude into the closed outer volume 2a. However, according to the foregoing embodiment of the present invention, even though such local force acts externally on the side center pillar 2, the applied local force can advantageously be dispersed through the filler 11 in all directions outwardly from the point of application of such force to the side 4 center pillar 2. Considering that the filler 11 employed in the practice of the present invention is chosen to have the average compressive strength not smaller than 4 MPa and the maximum bending strength not smaller than 10 MPa as hereinbefore discussed, the absorption of energies about equal to the maximum energy absorption can be attained, thereby minimizing the bending of the side center pillar 2. On the other hand, although the filler 11 is positioned so as to fill up not an entire, volume represented by the cross-section of the side center pillar 2, but only the closed outer volume 2a delimited between the outer panel 12 and the intermediate panel 14, the bending moment at the time of start of the buckling motion makes no difference with that developed when the filler is used to fill up the entire volume represented by the cross-section of the side center pillar and can, therefore, absorb effectively energies generated consequent upon collision with a minimized amount of material for the filler 11. Moreover, since the filler 11 is made of the expandable material, the automobile bodyshell 1 can have a lightweight feature. Accordingly, the safety against collision can advantageously be increased while securing an increased mileage.

In the practice of the foregoing embodiment of the present invention, the reinforcement or intermediate panel 14 has at least one of a strength (such as tensile strength and/or yield point) and a rigidity which is preferably equal to or higher than that of the outer panel 12. In other words, if both the strength and the rigidity of the intermediate panel 14 are lower than those of the outer panel 12, the intermediate panel 14 will be locally buckled, when the region of the outer panel 12 aligned with the belt line is bent to protrude inwardly of the hollow of the side center pillar 2, thereby allowing the outer panel 12 to protrude inwardly of the hollow (defined by the closed outer and inner volumes 2a and 2b) of the side center pillar 2 together with the filler 11. However, if at least one of the strength and the rigidity of the intermediate panel 14 is equal to or higher than that of the outer panel 12, a possible bending of the outer panel 12 in a direction inwardly of the hollow of the side center pillar 2 can assuredly be suppressed.

Also, at a portion of the side center pillar 2 where the filler 11 is positioned, a gap between the outer panel 12 and the intermediate panel 14 is preferably of a size not smaller than 2 mm, more preferably not smaller than 3 mm. Where no filler 11 is disposed, the smaller the gap between the outer and intermediate panels 12 and 14, the smaller the maximum bending moment the side center pillar 2 can endure. However, where the filler 11 is disposed such as in the embodiment of the present invention, no sufficient filling effect will be brought about by the filler 11 and the presence of the filler 11 makes no difference with the absence of the filler if the gap between the outer and intermediate panels 12 and 14 is smaller than 2 mm. On the other hand, if the gap is of a size greater than 20 mm, the light-weight feature will be reduced and a demerit will occur in terms of cost and, therefore, the gap size should be not greater than 20 mm.

Preferably, at least a portion of the closed outer volume 2a is provided with a layer of adhesive material (paint sealer) of a kind having an adhesive shear strength which is not smaller than 3 MPa. In the illustrated embodiment, the adhesive layer generally identified by 9 is employed within the closed outer volume 2a and between the outer panel 12 and the intermediate panel 14 to help the foamed filler 11 retained assuredly in position within the closed outer volume 2a by the effect of its adhesive strength. This is particularly advantageous where a filler material which eventually forms the foamed filler 11, that is, the filler 11 before being foamed has an insufficient stickable property that allows it to be cling to the inner surface of the outer panel 11 and/or that of the intermediate panel 14. It is, however, to be noted that where the single adhesive layer 9 is to be employed, it should be positioned between the outer panel 12 and the foamed filler 11.

The use of the adhesive layer 9 within the closed outer volume 2a and on one or both sides of the foamed filler 11 is particularly advantageous in that not only can the force acting locally on the outer panel 12 be assuredly dispersed to its surroundings through the filler 11, but the maximum bending moment the side center pillar 2 can endure can be increased effectively. Also, where at least one of the strength and the rigidity of the intermediate panel 14 is chosen to be equal to or higher than that of the outer panel 12 as discussed hereinbefore, the presence of the adhesive layer 9 is effective to avoid inward protrusion of the outer panel 12 and also to avoid outward protrusion of the outer panel 12 with respect to the hollow of the side center pillar 2, thereby effectively preventing the outer panel 12 from being bent.

However, instead of the use of the adhesive layer 9, the foamed filler 11 itself, or the filler material that eventually forms the foamed filler 11, may have an adhesive shear strength which is not smaller than 3 MPa relative to the outer panel 12. The use of the filler 11 having the adhesive shear strength not smaller than 3 MPa advantageously eliminates the use of the adhesive layer and, yet, brings about such an effect which would be brought about if the adhesive layer were used.

The filler 11 extends a distance in a direction conforming to the lengthwise direction of the side center pillar 2 that is generally perpendicular to the longitudinal sense of the automobile bodyshell 1. Preferably, the distance over which the filler 11 extends is preferably equal to or greater than 15% of the length of the side center pillar 2 as measured between upper and lower load bearing points, that is, upper and lower ends of the side center pillar 2 that are joined to the corresponding longitudinal roof side rail 3 and the corresponding longitudinal side sill 4. The greater the distance over which the filler 11 extends, the higher the energy absorption. However, the energy absorption will be substantially saturated when the distance over which the filler 11 extends is 15% of the length of the side center pillar 2 between the load bearing points thereof. Accordingly, the presence of the filler 11 extending the distance equal to and greater than 15% of the length of the side center pillar 2 is effective to maximize the energy absorption.

Although in the foregoing embodiment of the present invention, the filler 11 has been described having an average compressive strength not smaller than 4 MPa and preferably not smaller than 5 MPa and a maximum bending strength not smaller than 10 MPa and preferably not smaller than 60 MPa, the average compressive strength may be equal to or greater than 4 MPa and preferably 5 MPa or the maximum bending strength may be equal to or greater than 10 MPa and preferably 60 MPa. The use of the filler 11 having the specific average compressive strength or the specific maximum bending strength is equally effective to increase the safety against collision.

Also, the filler 11 interposed between the outer and intermediate panels 12 and 14 may be of a double layered structure comprising an outer layer secured to the outer panel 12 (where a collision load acts) and an inner layer secured to the intermediate panel 14 (where the collision load is reacted). In the case of the filler 11 being of the double-layered structure, the outer layer on the outer panel 12 may have an average compressive strength equal to or greater than 4 MPa and preferably 5 MPa and the inner layer on the intermediate panel 14 may have a maximum bending strength equal to or greater than 10 MPa and preferably 60 MPa. The use of the double-layered structure for the filler 11 is effective to permit the outer layer to deal with the compressive load acting directly on the outer panel 12 and the bending load acting on the intermediate panel 14, respectively. Thus, maximized utilization of respective properties of the outer and inner layers forming the filler 11 is possible to accomplish a robust and effective reinforcement of the side center pillar 2. It is, however, to be noted that in a broad aspect of the present invention, the filler 11 may not be always prepared from an expandable material.

Although in the foregoing embodiment the reinforcement or intermediate panel 14 has been used between the outer and inner panels 12 and 13, the use of the reinforcement 14 is not essential and may therefore be dispensed with. Where no reinforcement or intermediate panel 14 is used, and in order for the filler 11 to be provided partly within the hollow of the side center pillar 2, the filler 11 has to be fitted to the inner surface of the outer panel 12 confronting the hollow of the side center pillar 2, with or without the use of the adhesive layer 9. In such case, in order to define a space in which the material for the filler 11 can expand and fill up, a partition plate member having no reinforcing effect may be provided on the inner surface of the outer panel 12, confronting the hollow of the side center pillar 2, in spaced relation thereto. Where the filler 11 is not made of an expandable material, the filler 11 has to be bonded thereto by the use of the layer of adhesive material. Also, the filler 11 may not have a generally U-shaped cross-section, the U-shaped cross-section not only for the filler 11 but also for the outer panel 12 is preferred to enhance the reinforcing effect with minimized use of the filling material.

It is to be noted that the use of the foamed filler 11 itself, or the filler material that eventually forms the foamed filler 11, if it has an adhesive shear strength not smaller than 3 MPa relative to the outer panel 12, has been described effective to eliminate the use of the at least layer of adhesive material 9. However, depending on the manner in which the filler material disposed within the closed outer volume 2a is heated to expand, the use of the adhesive layer may not be always essential. By way of example, if during the heating the filler material is laid horizontally together with the frame structure or any automobile bodyshell segment in which the filler material is accommodated, the adhesive layer may not be necessary since the filler material laid horizontally can stationarily rest on an inner surface of a component panel of the frame structure or automobile bodyshell segment. In such case, once the filler material has been expanded, the foamed filler 11 can self-cling to the inner surface of the component panel of the frame structure or automobile bodyshell segment.

FIGS. 6 and 7 illustrate a modified form of the side center pillar 2. In this modification shown in FIGS. 6 and 7, upper and lower reinforcement members (or upper and lower intermediate panel members) 15 and 16 are disposed within the hollow of the side center pillar 2 so as to overlap each other at the belt-line region in spaced relation to each other and also to any one of the outer and inner panels 12 and 13. Each of the upper and lower reinforcement members 15 and 16 has its opposite side edges formed with respective flanges 15a or 16a welded together with the flanges 12a and 13a of the outer and inner panels 12 and 13. However, at the belt-line region generally intermediate of the length of the side center pillar 2, the flanges 15a and 16a of the upper and lower reinforcement members 15 and 16 are welded having been held in tight contact with each other and are in turn wended having been sandwiched between the flanges 12a and 13a of the outer and inner panels 12 and 13. Also, a lower end portion of the upper reinforcement member 15, which overlap an upper end portion of the lower reinforcement m ember 16 at the belt-line region is preferably positioned between the outer panel 12 and that upper end portion of the lower reinforcement member 16.

In this modification, the filler 11 is disposed in and fills up not only an outer space between the outer panel 12 and the upper reinforcement member 15, but also an inner space between the upper reinforcement member 15 and the lower reinforcement member 16 as clearly shown in FIG. 7, although it may sufficient for the filler 11 to fill up at least one of those spaces.

The concept of the present invention, which in the foregoing embodiment as well as the various embodiments which follow, has been embodied in the side center pillars 2, is equally applicable to any frame structure such as, for example, the longitudinal roof side rails 3, the longitudinal side sills 4, the front side pillars 5, the rear side pillars 6, front side frames, rear side frames, cross-bars connecting the left and right longitudinal roof side rails 3 together and the left and right longitudinal side sills 4 together, braces, an impact bumper, and/or a bumper reinforcement. Where the frame structure is made up of two panel members welded or joined; in any suitable manner together, the filler 11 in accordance with the teachings of the present invention has to be provided on an inner surface of one or both of the panel members. On the other hand, where the frame structure made up of the two panel members includes reinforcement or intermediate panel member intervening between the two panel members, the filler 11 has to be disposed in a space between the reinforcement or intermediate panel member and one or both of the two panel members.

Where, however, as shown in FIG. 8, one of left and right front side frames 21 has a closed-box section delimited between upper and lower panels 22 and 23 and has a bent region defined therein, the filler 11 is disposed on an inner surface of the lower panel 23 confronting the hollow of the respective front side frame 21 at the bent region thereof. By so doing, in the event that as a result of application of the impact load Af (See FIG. 1) during an automobile collision a front portion of the front side frame 21 is collapsed, accompanied by eventual bucking of the front side frame 21 at the bent region to allow that front portion of the front side frame 21 to bend so as to incline upwardly. The impact energies generated at the time the front side frame 21 buckles in the manner described above can be effectively absorbed by the filler 11. Thus, in the example shown in FIG. 8, the filler 11 has to be disposed on one side of the front side frame where tensile stresses are likely to be developed by the bending moment acting on the front side frame as a result of application of the impact load Af.

In the case of each of the rear side frames 25 made up of upper and lower panels 26 and 27 welded or joined together to define a generally closed-box section as shown in FIG. 9, the respective rear side frame 25 has its rear end portion that must be designed not to buckle at a bent region so as to incline upwardly upon application of an impact load Ar (See FIG. 1). For this reason, the filler 11 is shown as disposed on an inner surface of the upper panel 26 confronting the hollow of the respective rear side frame 25.

Second Embodiment (FIGS. 10 to 13)

The second embodiment of the present invention which will now be described differs from the first; embodiment thereof in respect of the shape of the reinforcement or intermediate panel 14.

Referring particularly to FIG. 10, the intermediate panel 14 has a plurality of longitudinally extending parallel grooves 14b of a generally U-sectioned shape defined therein so as to leave a bead on opposite sides of each groove 14b. Accordingly, the closed outer volume 2a defined within the hollow of the side center pillar 2 and between the outer panel 11 and the intermediate panel 14 has a varying spacing therebetween which is maximum at a position aligned with each of the longitudinal grooves 14b and minimum at a position aligned with each of the beads.

In the embodiment shown in FIG. 10, the filler 11 is expanded to fill up the closed outer volume 2a and has a varying thickness that is maximum at portions of the filler 11 that fill up the respective longitudinal grooves 14b and minimum at portions of the filler 11 that rests on the respective beads.

Figure 11:
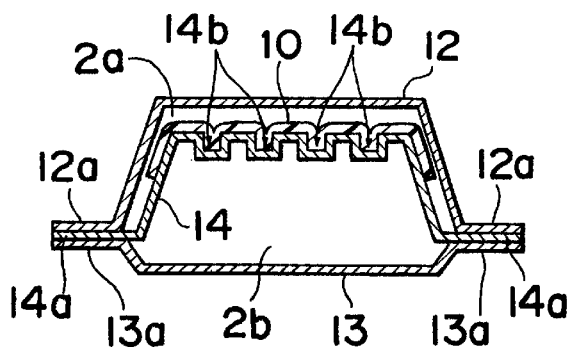
FIG. 11 is a view similar to FIG. 10, showing the manner in which a sheet of filling material which eventually forms the filler is disposed in the side center pillar shown in FIG. 10.

Assemblage of the side center pillar 2 according to the second embodiment of the present invention can be carried out in a manner substantially similar to the method, described in connection with the foregoing embodiment with reference to FIGS. 4A to 4C. However, in view of the presence of the longitudinal grooves 14b in the intermediate panel 14, placement of the filler sheet 10 for the filler 11 slightly differs from that in the foregoing embodiment. Specifically, as shown in FIG. 11, when the filler sheet 10 is to be placed in position, portions of the filler sheet 10 which align with the longitudinal grooves 14b have to be plugged into the associated longitudinal grooves 14b generally half-way the depth of each longitudinal groove 14b so as to leave a gap between the bottom of each longitudinal groove 14b and the corresponding portion of the filler sheet 10. Once this has been done, the filler sheet 10 can be assuredly retained in position on the inner surface of the intermediate panel 14 without no displacement taking place before the filler sheet 10 is expanded to complete the filler 11.

Also, since gaps are formed between the plugged portions of the filler sheet 10 and the bottoms of the longitudinal grooves 14b, these gaps serve as a passage for the flow of the electrophoretic paint therethrough so as to facilitate throwing (adherence) of the electrophoretic paint and discharge of an excessive amount of the electrophoretic paint while avoiding formation of pools of the electrophoretic paint. Consequently, not only can a possible separation of the eventually formed electrodeposited paint layer, which would otherwise result from variation in thickness of the paint layer brought about by the presence of paint pools, be avoided advantageously, but any possible reduction in corrosion resistance can also be minimized. As a matter of course, the filler sheet 10 is, when heated during the heating of the electrophoretic paint applied to the automobile bodyshell 1 (FIG. 1), expanded and cured to complete the filler 11 that completely fills up the space between the outer panel 12 and the intermediate panel 14 including the longitudinal grooves 14b.

Thus, since according to the second embodiment of the present invention, the longitudinal parallel grooves 14b are formed in the reinforcement or intermediate panel 14 in a direction longitudinally thereof, retention of the filler sheet 10 and electrophoretic painting can be performed in good condition and, also, the rigidity of the reinforcement or inner panel 14 can be increased to a value about equal to or higher than that of the outer panel 12 as discussed in connection with the previous embodiment, thereby effectively suppressing any possible inward protrusion of the belt-line region of the side center pillar 2.

Figure 12:
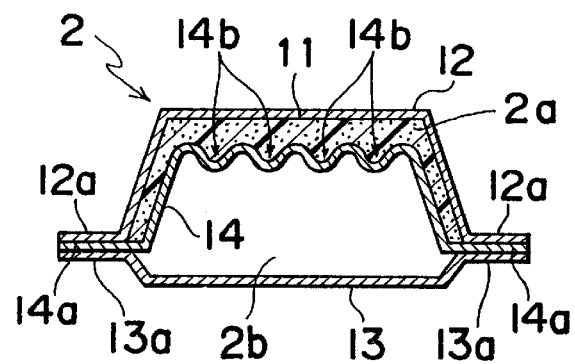
FIGS. 12 and 13 are views similar to FIG. 10, showing respective modified forms of the side center pillars.
Figure 13:
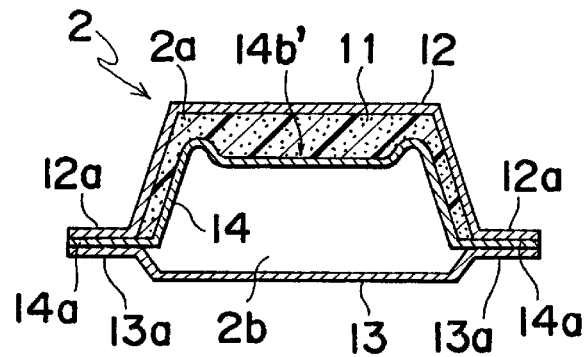
Figure 14:
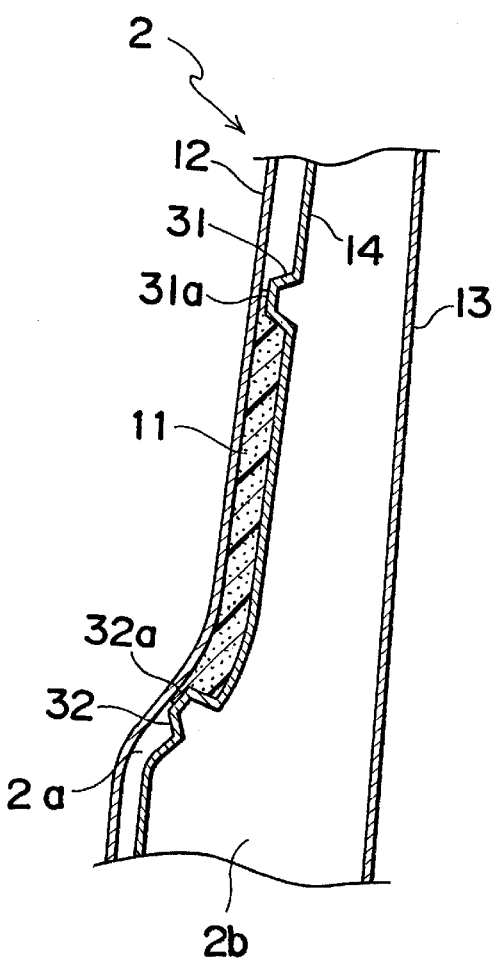
FIG. 14 is a fragmentary longitudinal sectional view of the side center pillar according to a third preferred embodiment of the present invention.

In the embodiment shown in FIGS. 10 and 11, each of the longitudinal grooves 14 has been shown and described having a generally U-sectioned configuration. However, the sectional representation of each longitudinal groove 14b may not be always limited to that shown therein, but may be of a generally triangular shape as shown in FIG. 12. Also, while the plural longitudinal parallel grooves 14b have been shown and described as employed in the reinforcement or intermediate panel 14, the number of the longitudinal parallel grooves 14b may not be limited to that shown in FIG. 10, but a single longitudinal groove 14b' may be sufficient as shown in FIG. 13, leaving two beads on respective sides of such single longitudinal groove 14b'. discussed hereinbefore. Also, since the gaps 31a and 32a provide a relatively large resistance, the filler sheet 10 when expanded fills up the belt-line region of the closed outer volume 2a at ah initial stage of foaming and subsequently squeeze in part into the gaps 31a and 32a to fill up those gaps 31a and 32a. Consequently, by adjusting the span between the gaps 31a and 32a and the size of each gaps 31a and 32a, it is possible to reduce variation of the expand ratio of the filler material within the belt-line region of the closed outer volume 2a even though the amount of the filler material set in position varies. The term "expand ratio" of the filler material referred to above represents the volume of the filler material after having been expanded, which is divided by the volume of the same filler material before being expanded and then multiplied by 100.

Moreover, since upper and lower end portions of the filler sheet 10 are, during foaming of the filler material, constrained by the upper and lower gaps 31a and 32a, which is in contrast to the first embodiment in which the filler sheet 10 is foamed with its upper and lower ends unconstrained, the possibility of cracking occurring in the upper and lower ends thereof after completion of foaming can be avoided advantageously. Accordingly, the provision of the dividing elements 31 and 32 is effective not only to retain the filler sheet 10 in position, also to allow the filler sheet 10 to be eventually foamed to uniformly fill up the closed outer volume 2a, and to avoid any possible reduction in energy absorbing performance which would otherwise result in when cracking occurs in the upper and lower ends of the eventually expanded filler 11.

In the practice of the third embodiment of the present invention described above, the size of each of the upper and lower gaps 31a and 32a is preferably smaller than that portion of the spacing between the outer panel 12 and the intermediate panel 14, where the filler 11 is disposed, and equal to or smaller than 5 mm. If the gap size of each gap 31a and 32a is larger than 5 mm, the effect to reduce variation of the expand ratio of the filler sheet 10 and As is the case with the previously described embodiment, the concept of the present invention employed in this second embodiment can be equally applied to any other frame structure.

Third Embodiment (FIGS. 14 to 20)

In the third embodiment of the present invention, the use has been made of upper and lower dividing elements 31 and 32 to define upper and lower boundaries of that portion of the closed outer volume 2a where the filler 11 is accommodated. Specifically, in the example shown in FIG. 14, the upper and lower dividing elements 31 and 32 are constituted by upper and lower transverse bunches, respectively, which are formed integrally in and with the intermediate panel 14 by the use of any known press work so as to extend transverse to the lengthwise direction of the intermediate panel 14. Each of the transverse bunches so formed protrudes towards the outer panel 12 so as to terminate as at a distance spaced inwardly from the outer panel 12 to thereby define a corresponding gap 31a or 32a so that the belt-line region of the space for accommodating the filler 11 may be communicated with an upper or lower region of the space above or below that belt-line region. These gaps 31a and 32a are, when the filler sheet 10 is expanded in the manner as hereinbefore described, filled up by the filler 11. Also, the presence of the gaps 31a and 32a are advantageous in that when the filler sheet 10 is placed in position on the intermediate panel 14, the filler sheet 10 can be firmly retained in position without allowing it to displace in a direction lengthwise of the intermediate panel 14.

Figure 15:
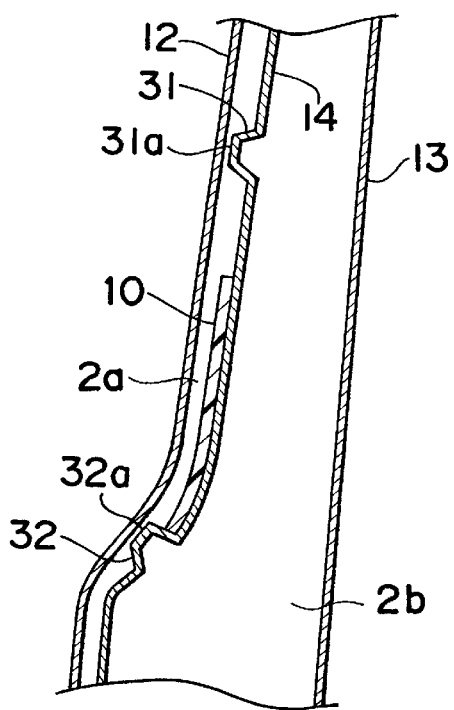
FIG. 15 is a view similar to FIG. 14, showing the side center pillar before a sheet of filling material is expanded to form the filler.
Figure 16:
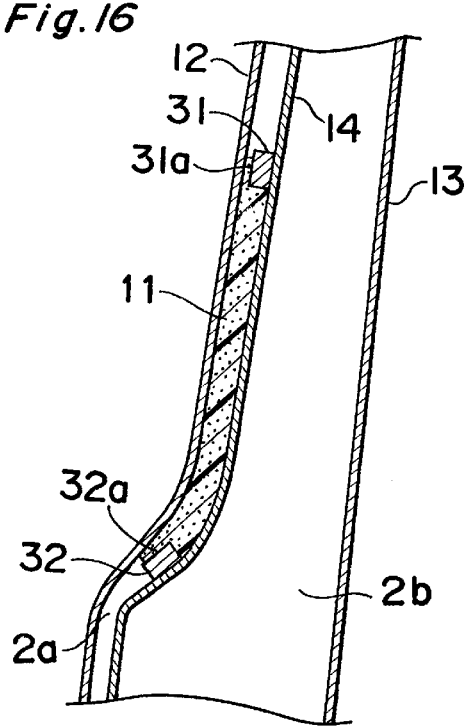
FIGS. 16 to 20 are views similar to FIG. 14, showing respective modified forms of the side center pillar shown in FIG. 14.
Figure 17:
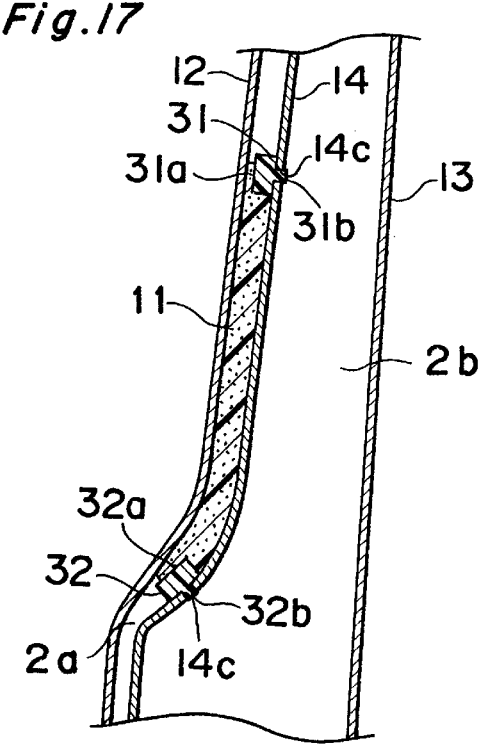

According to the third embodiment, if the side center pillar 2 is assembled after the filler sheet 10 has been placed above the lower dividing element 32 so as to stand generally upright while lying against the intermediate panel 14 as shown in FIG. 15, any possible downward fall of the filler sheet 10 within the outer closed volume 2a during the electrophoretic painting process can advantageously avoided as is the case with the second embodiment the effect to suppress any possible occurrence of cracking in the upper and lower ends of the eventually expanded filler 11 cannot be obtained sufficiently.

The dividing elements or bunches 31 and 32 employed in the third embodiment of the present invention are formed integrally with the intermediate panel 14 and, therefore, no member separate from the intermediate panel 14 is needed to provide each dividing element. However, this is not always essential and a member separate from the intermediate panel 14 may be employed to form the respective dividing element 31 or 32. By way of example, in a modification shown in FIG. 16, generally plate-like bars prepared from either steel or a synthetic resin is welded, or otherwise joined in any suitable manner, to the outer surface of the intermediate panel 14 confronting the closed outer volume 2a in spaced relation to each other to define the respective dividing elements 31 and 32. In another modification shown in FIG. 17, while the intermediate panel 14 is formed with anchor holes 14c in spaced relation to each other, generally plate-like bars prepared from a synthetic resin and having respective anchor projections 31b and 32b are connected to the intermediate panel 14 with the anchor projections 31b and 32b plugged into the associated anchor holes 14c in the intermediate panel 14.

Figure 18:
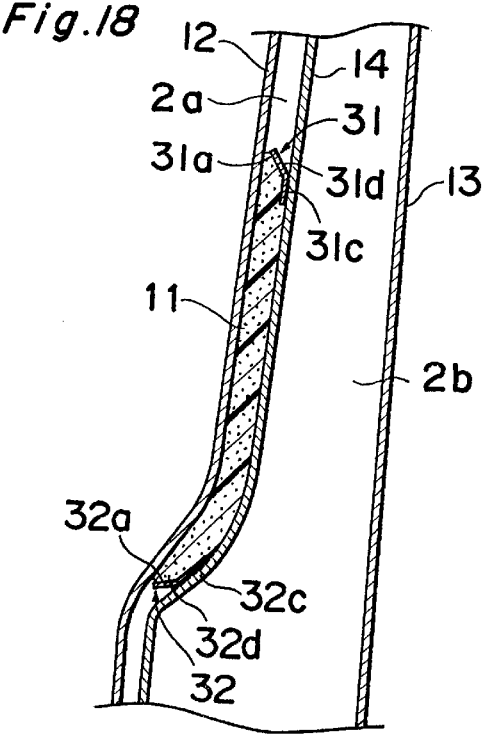

In a third modification shown in FIG. 18, each of the dividing elements 31 and 32 is in the form, of a generally rectangular steel plate having a relatively small thickness and bent along a longitudinal center line generally intermediate of the width thereof to define an anchor segment 31c or 32c and a cantilevered flexible segment 31d or 32d lying an angle relative to the anchor segment 31c or 32c. The dividing elements 31 and 32 of the configuration shown in FIG. 18 can readily be formed by the use of any known press work.

In this modification of FIG. 18, the dividing element 31 is connected to the intermediate panel 14 with the anchor segment 31c welded thereto while the cantilevered flexible segment 31d protrudes diagonally upwardly towards the outer panel 11 to a position spaced a distance inwardly from the outer panel 11 to define the gap 31a. On the other hand, the dividing element 32 is connected to the intermediate panel 24 with the anchor segment 32c welded thereto while the cantilevered flexible segment 32d protrude diagonally downwardly towards the outer panel 11 to a position spaced a distance inwardly from the outer panel 11 to define the gap 32a. In this assembly, by adjusting the resilient restoring force of the cantilevered flexible segments 31d and 32d, the filler sheet 10 can be, during the foaming process, constrained at its upper and lower ends by the associated flexible segments 31d and 32d to thereby suppress any possible occurrence of cracking and also to thereby reduce variation of the expand ratio.

Figure 19:
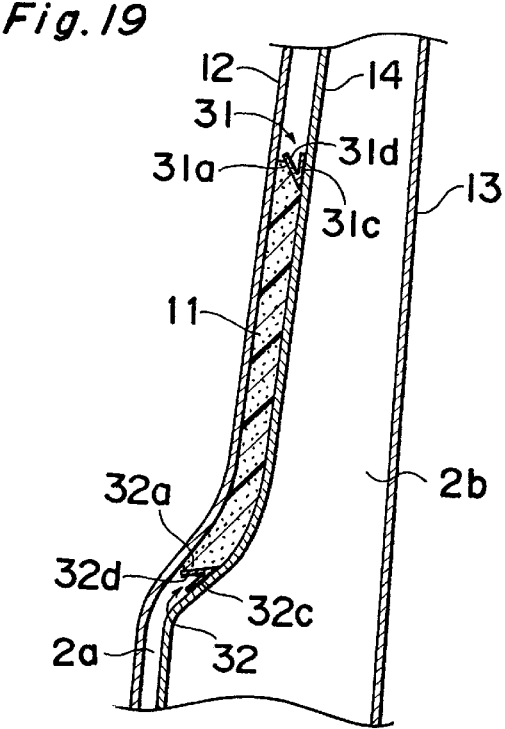

A fourth modification shown in FIG. 19 is substantially similar to the modification shown in FIG. 18, except that each of the dividing elements 31 and 32 is bent to assume a generally V-sectioned configuration. Even with these dividing elements 31 and 32 shown in FIG. 19, effects substantially similar to those brought about by the modification of FIG. 18 can be appreciated.

Figure 20:
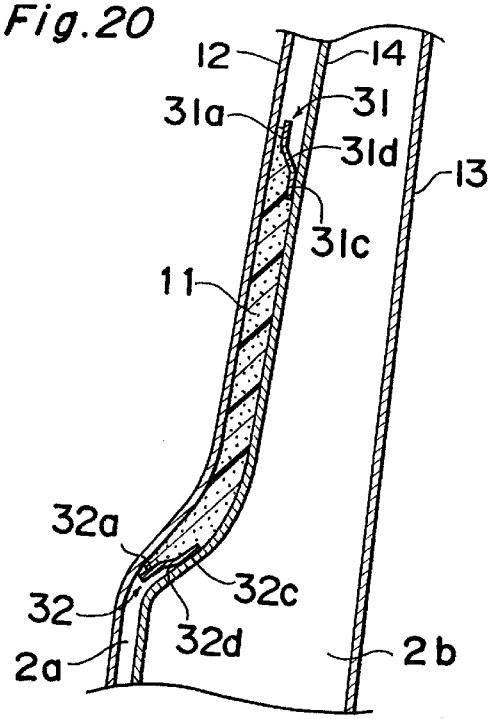

FIG. 20 illustrates a fifth modification of the third embodiment of the present invention in which, as is the case with any one of the modifications shown respectively in FIGS. 16 to 19, members separate from the intermediate panel 14 are employed for the dividing elements 31 and 32. In this modification of FIG. 20, each of the dividing elements 31 and 32 comprises a generally rectangular plate made of, for example, steel and having a relatively large thickness. The rectangular plate forming each of the dividing elements 31 and 32 is bent stepwise to assume a generally S-shaped configuration including an anchor segment 31c or 32c and a cantilevered flexible segment 31d or 32d that lie generally parallel to the anchor, segment 31c or 32c.

As is the case with the modification shown in FIG. 18, the dividing element 31 is connected to the intermediate panel 14 with the anchor segment 31c welded thereto while the cantilevered flexible segment 31d extends upwardly and generally parallel to the outer panel 11 at a position generally intermediate between the outer and intermediate panels 11 and 14 while defining the corresponding gap 31a between the flexible segment 31d and the outer panel 11, whereas the dividing element 32 is connected to the intermediate panel 14 with the anchor segment 32c welded thereto while the cantilevered flexible segment 32d extends downwardly and generally parallel to the outer panel 11 at a position generally intermediate between the outer and intermediate panels 11 and 14 while defining the corresponding gap 32a between the flexible segment 32d and the outer panel 11.

Even with this modification shown in FIG. 20, by adjusting the resilient restoring force of the cantilevered flexible segments 31d and 32d, the filler sheet 10 can be, during the foaming process, constrained at its upper and lower ends by the associated flexible segments 31d and 32d to thereby suppress any possible occurrence of cracking and also to thereby reduce variation of the expand ratio.

It is to be noted that a portion of each of the dividing elements 31 and 31 which confronts the associated gap 31a or 31a may have one or more perforations defined therein so as to extend across the thickness of that portion of the respective dividing element 31 or 32.

Although in the third embodiment of the present invention including its related modifications, the dividing elements 31 and 32 have been shown and described as provided on the reinforcement or intermediate panel 14, they may be provided on the inner surface of the outer panel 11 confronting the closed outer volume 2a. It is also to be noted that instead of the gaps 31a and 32a, the dividing elements 31 and 32 may have defined therein respective perforations or vent passages that function in a manner similar to the gaps 31a and 32a in the event that the dividing elements 31 and 32 have their opposite ends abutting the outer and intermediate panels 12 and 14.

Fourth Embodiment (FIGS. 21 to 25)

Figure 21:
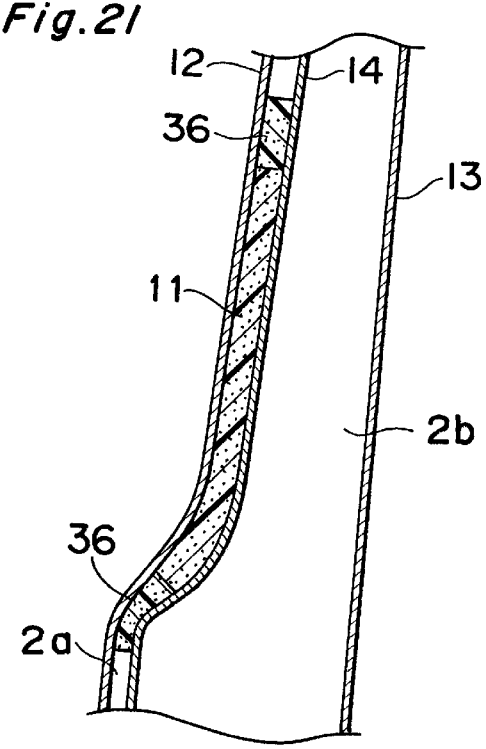
FIG. 21 is a fragmentary longitudinal sectional view of the side center pillar according to a fourth preferred embodiment of the present invention.

In this fourth embodiment of the present invention, in addition to the filler 11 (which is hereinafter referred to as the first filler 11) discussed hereinbefore, an additional or second filler 36 prepared from an expandable filler material is employed adjacent each of upper and lower ends of the first filler 11. Referring particularly to FIG. 21, the second filler 36 is accommodated within the closed outer volume 2a and positioned in abutment with each of the upper and lower ends of the first filler 11. The expandable filler material for the second fillers 36 is of a kind having a higher expand ratio than that of the expandable filler material for the first filler 11 and may be, for example, an expandable urethane resin or an expandable rubber.

Figure 22:
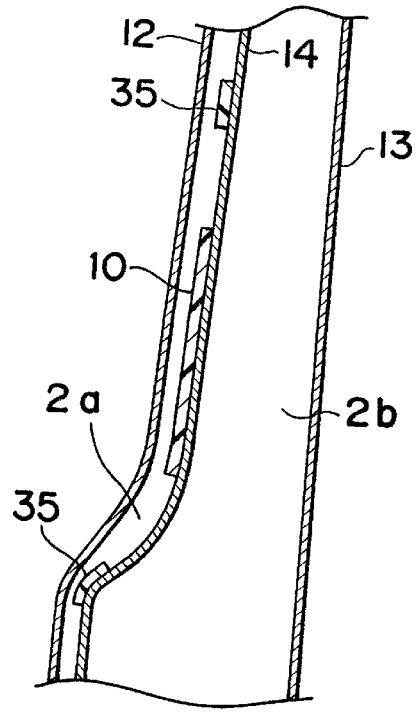
FIG. 22 is a view similar to FIG. 21, showing the side center pillar before a sheet of filling material is expanded to form the filler.

In assembling the side center pillar 2, the filler sheet 10 which eventually forms the first filler 11 is set on the surface of the reinforcement or intermediate panel 14 and, simultaneously therewith, similar sheets 35 of expandable filler material, which eventually form the second fillers 36, are set on the surface of the inner panel 14 at respective locations upward and downward of the opposite ends of the filler sheet 10 as shown in FIG. 22. At this time, the first and second filler sheets 10 and 35 are so positioned and so arranged that when and after they have been expanded to form the respective first and second fillers 10 and 36 as shown in FIG. 21, the second fillers 36 can be held in abutment with the respective opposite ends of the first filler 11. This can be accomplished by positioning the second filler sheets 35 at respective locations spaced a distance outwardly from the associated opposite ends of the first filler sheet 10 as shown in FIG. 22 before they are expanded. After the side center pillar 2 has been assembled with the automobile bodyshell 1 consequently completed, the automobile bodyshell 1 is dipped in the electrophoretic paint bath and then dried in the manner hereinbefore described. During the automobile bodyshell 11 being dried, the first and second filler sheets 10 and 35 within the side center pillar 2 are expanded to complete the first and second fillers 11 and 36 then filling up the closed outer volume 2a.

According to the fourth embodiment of the present invention, even though cracking may occur in one or both of the opposite ends of the first filler 11, the presence of the second fillers 36 less susceptible to cracking because of a relatively high expand ratio is effective to suppress propagation of the cracking in one or both of the opposite ends of the first filler 11 and, consequently, any possible reduction in impact energy absorption can be avoided advantageously. As a result, the fourth embodiment of the present invention dispenses with the use of the dividing elements 31 and 32 such as employed in the third embodiment and, hence, any possible variation of the expand ratio can be reduced by allowing the first filler sheet 10 to expand with its opposite ends left unconstrained. In addition, the position where the first filler sheet 10 is placed and is subsequently expanded can advantageously be adjusted within the belt-line region of the closed outer volume 2a.

The first and second filler sheets 10 and 35, both set in position inside the side center pillar 2 in the manner detailed hereinabove, are simultaneously expanded during the drying process subsequent to dipping of the automobile bodyshell 1 into the electrophoretic paint bath. However, n the practice of the fourth embodiment of the present invention, arrangement may be made so that expansion of the first filler sheet 10 to form of the first filler 11 may be followed by formation of the second fillers 36 and this can be accomplished in a manner which will now be described with particular reference to FIG. 23.

Referring to FIG. 23, the first filler sheet 10 is shown to have been expanded to complete the first filler 11. None of the second fillers 36 has not yet been formed, that is, none of the first filler sheets 35 such as shown in FIG. 22 has not been set in position on the surface of the intermediate panel 14. However, after the first filler 11 has been formed, two filler guns 37 are utilized to inject filler material such as, for example, that of a twin-pack cold setting system to respective locations adjacent to, and above and below the opposite ends of the first filler 11 and then to cause the injected filler material to expand to complete the second fillers 36. According to the technique shown in FIG. 23, the first filler 11 will not be affected by the presence of the second fillers 36 during the foaming operation and the first filler material 10 can be expanded in a completely unconstrained condition. Therefore, any possible variation of the expand ratio can further be reduced advantageously.

In a modification of the fourth embodiment of the present invention is shown in FIG. 24. This modification is particularly applicable where a portion of the reinforcement or intermediate panel 14 alignable with the first filler 11 is formed with an opening 14d that is utilizable to allow an attendant worker to view the first filler material 10 therethrough to ascertain if the first filler material 10 has been correctly set in position or to enable a positioning tool to make access to the first filler material 10 as will be described later. As a matter of course, the presence of the opening 14d may allow the first filler sheet 10 within the belt-line region of the closed outer volume 2a to leak therethrough into the closed inner volume 2b during expansion thereof. Once this occurs, and after the first filler sheet 10 has been expanded, that portion of the first filler sheet 10 leaking into the closed inner volume 2b will, when expanded, have cracking occurring therein.

Accordingly, a third sheet 35a of expandable filler material similar to or identical with the second filler sheet is set on the surface of the inner panel 13, confronting the closed inner volume 2b, in alignment with the opening 14d as shown in FIG. 25 so that, when and after the third filler sheet 35a as well as the first and second filler sheets 10 and 35 has been expanded, a portion of the first filler 11 protruding into the closed inner volume 2b through the opening 14d can be caught by and integrated together with the third filler 36a as shown in FIG. 24.

Fifth Embodiment (FIGS. 26 to 29)

In this fifth embodiment of the present invention, upper and lower metallic reinforcing members 41 and 42, both made of a steel and configured to represent a generally U-sectioned shape, are utilized and positioned within the hollow of the side center pillar 2, particularly the closed inner volume 2b, at respective location adjacent the upper and lower ends of the filler sheet 10 and, specifically, generally above and below that portion of the closed inner volume 2b which is aligned with the first filler sheet 10 or the first filler 11.

Figure 27:
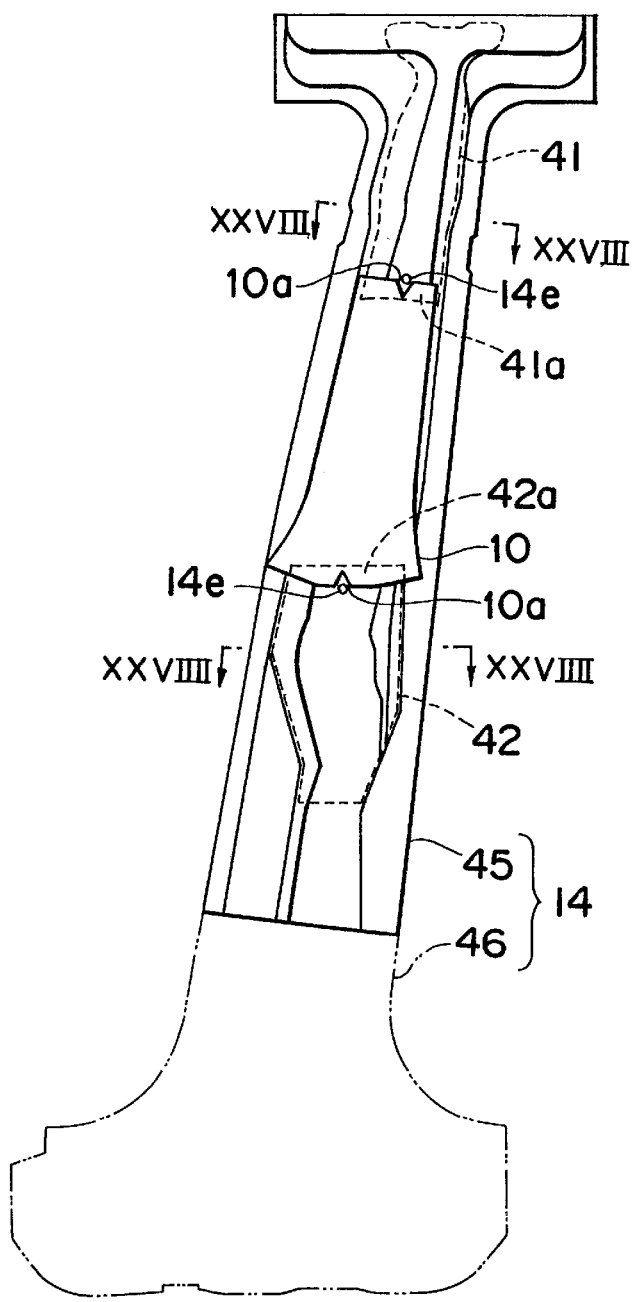
FIG. 27 is a longitudinal side view, with a portion cut out, of the side center pillar of FIG. 26 in an assembled condition, showing a relation between a sheet of filling material and upper and lower reinforcing members employed therein.
Figure 28:
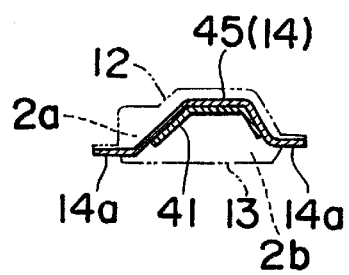
FIG. 28 is a cross-sectional view taken along the line XXVIII-XXVIII shown in FIG. 27.
Figure 29:
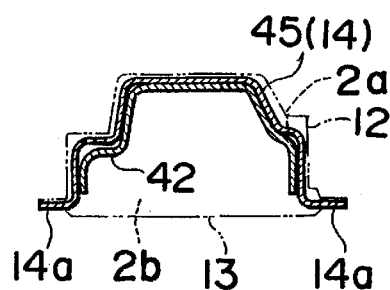
FIG. 29 is a cross-sectional view taken along the line XXVIIII-XXVIIII shown in FIG. 27.

Referring to FIGS. 27 and 28, the upper metallic reinforcing member 41 is positioned at a level above the upper end of the filler sheet 10 and rigidly connected, or otherwise welded, to the surface of the reinforcement or intermediate panel 14 confronting the closed inner volume 2b. On the other hand, as shown in FIG. 27 and 29, the lower metallic reinforcing member 42 is positioned at a level below the lower end of the filler sheet 10 and rigidly connected, or otherwise welded, to the surface of the reinforcement or intermediate panel 14 confronting the closed inner volume 2b. In other words, the upper and lower metallic reinforcing members 41 and 42 are welded to the surface of the intermediate panel 14 confronting the closed inner volume 2b at respective locations above and below that portion of the closed inner volume 2b which is aligned with the first filler sheet 10 or the first filler 11 that is positioned within the closed outer volume 2a.

So far as the fifth embodiment shown is concerned, the reinforcement or intermediate panel 14 is made up of two panel members 45 and 46 jointed or otherwise welded together in line with each other. While in FIG. 26 the lower panel member 46 and the outer panel 12 are not shown, the lower panel member 46 forming a part of the reinforcement or intermediate panel 14 is shown in FIG. 27 by the phantom line, The upper and lower metallic reinforcing members 41 and 42 referred to above are fixedly carried by the upper panel member 45 and are utilized to minimize change in strength of the intermediate panel 14 or the upper panel member 45 at a respective boundary between a region where the first filler 11 eventually occupies and a region where no first filler 11 occupy.

The upper metal reinforcing member 41 has a lower end formed with an extension 41a which eventually overlaps the upper end of the first filler 11 and, on the other hand, the lower metal reinforcing member 42 has an upper end formed with an extension 42a which eventually overlaps the lower end of the first filler 11. The extensions 41a and 42b are of such a size that respective parts thereof may overlap upper and lower end of the unexpanded filler sheet 10 as shown in FIG. 27 and, accordingly, when the filler sheet 10 is expanded to form the filler 10, the extent to which the overlapping takes place between the extensions 41a and 42b and the adjacent opposite ends of the filler 10 increases.

The first filler sheet 10 has its upper and lower ends formed respectively with generally triangular positioning cutouts 10a defined therein so as to extend inwardly thereof, for alignment with corresponding positioning holes 14e defined in the metallic reinforcing member 45 in spaced relation to each other. The positioning cutouts 10a and the positioning holes 14e are utilized for alignment purpose when the first filler sheet 10 is to be applied to the surface of the metallic reinforcing member 45 (the reinforcement or intermediate panel 14) opposite to the surface thereof confronting the closed inner volume 2b.

Preparatory to the application of the first filler sheet 10 to the metallic reinforcing member 45, the first filler sheet 10 is processed to have a predetermined or required shape and is then stored at a temperature equal to or lower than 10° C. so that, when the time comes to use the first filler sheet 10, the first filler sheet 10 can easily be positioned so as to conform to the shape of the reinforcement or intermediate panel 14 even though the hardness of the first filler sheet 10, which is pasty, changes with temperature.

Thus, according to the fifth embodiment of the present invention, the use of the upper and lower metallic reinforcing members 41 and 42 having the respective extensions 41a and 42a is effective to increase the strength of portions of the intermediate panel, 14 or the upper panel member 45 which do not align with the filler 11, to thereby minimize change in strength of the intermediate panel 14 or the upper panel member 45 at a respective boundary between the region where the first filler 11 eventually occupies and the region clear from the first filler 11. Accordingly, any possible stress set-up at each of that regions can advantageously avoided to thereby prevent those regions of the reinforcement or intermediate plate 14 from being deformed.

It is to be noted that in the fifth embodiment of the present invention, the upper metallic reinforcing member 41 may not be always necessary and may therefore be dispensed with.

Although the upper and lower metallic reinforcing members 41 and 42 are employed in the practice of the fifth embodiment of the present invention, the adhesive layer hereinbefore discussed in connection with the first embodiment of the present invention may be provided between the outer panel 12 and the filler 11 and/or the filler 11 itself may have an adhesive power, so that the adhesive shear strength of the upper and lower end portions of the filler 11 relative to the outer panel 12 can be set to a value lower than that of a portion of the filler 11 intermediate between the opposite end portions thereof. In such case, the adhesive shear strength of each of the upper and lower end portions of the filler 11 is preferably smaller than 7 MPa, or 0 MPa as the case permits, and that of the intermediate portion of the filler 11 is preferably equal to or larger than 7 MPa.

To choose a relatively low adhesive shear strength for the upper and lower end portions of the filler 11, an adhesive material which will exhibit an adhesive shear strength that is lower than that of the intermediate portion of the filler 11 may be employed. Alternatively, the same adhesive material as that used for the intermediate portion of the filler 11 may be used, in which case the adhesive material should be partially masked. Where, however, the filler 11 itself has an adhesive power, two kinds of filling materials capable of eventually exhibiting different adhesive strengths under shear may be employed for the filler 11. It is incidentally pointed out that in the practice of the previously described fourth embodiment of the present invention, the second fillers 36 may have an adhesive shear strength that is lower than that of the first filler 11.

Figure 30:
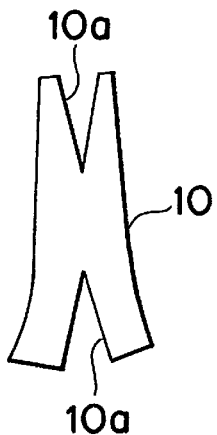
FIGS. 30 to 34 are front elevational views, respectively, showing different shapes of the filler employed in the practice of the present invention.
Figure 31:
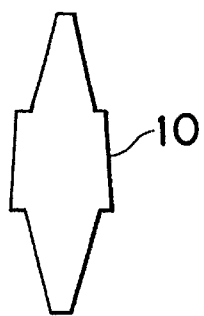

Also, to minimize change in strength of the intermediate panel 14 or the upper panel member 45 at a respective boundary between the region where the first filler 11 eventually occupies and the region clear from the first filler a 11, the strength of the opposite end portions of the filler 11 may be chosen to be lower than that of the intermediate portion thereof. By way of example, as shown in FIG. 30, the positioning, cutouts 10a defined in the upper and lower ends of the filler sheet 10 may be increased so considerably as to reduce the foam filling density of each of the upper and lower ends of the filler sheet 10 wherefore the strength of each of the upper and lower end portions of the filler 11 can be reduced down to a value lower than that of the intermediate portion of the filler 11. A similar effect can also be obtained when as shown in FIG. 31, the opposite end portions of the filler sheet 10 are so shaped as to taper outwardly, rather than to have the cutouts 10a such as shown in FIG. 30. The shape of the filler sheet 10 shown in FIG. 30 can readily be obtained by removing by cutting opposite triangular side portions of each of the upper and lower end portions of the filler sheet 10.

Figure 32:
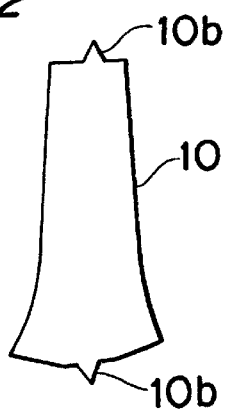
Figure 33:
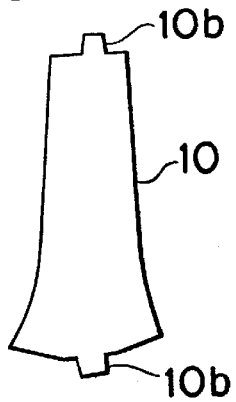
Figure 34:
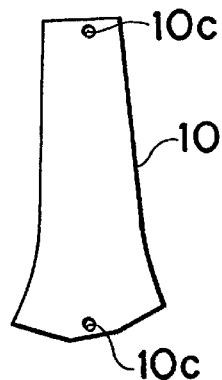

To facilitate positioning of the filler sheet 10 relative to the upper metallic reinforcing member 45, instead of the positioning cutouts 10a, the filler sheet 10 may have projections 10b formed with the respective opposite ends of the filler sheet 10 so as to protrude outwardly therefrom as shown in any of FIGS. 32 and 33, or alternatively with perforations 10c in the opposite ends of the filler sheet 10 as shown in FIG. 34. Where the projections 10b are formed in the filler sheet 10 (and, alternatively, where the cutouts 10a are formed in the filler sheet 10), and if the filler sheet 10 is positioned on the metallic reinforcing member 45 with the projections 10 overlapping the respective positioning holes 14e in the metallic reinforcing member 45 (or with the cutouts 10a aligned with the respective positioning holes 14e where the cutouts 10a are employed), the attendant worker can perform an inspection to ascertain whether or not the filler sheet 10 has been applied to the right position within the closed outer volume 2a after the outer panel 12 and the reinforcement or intermediate panel 14 have joined together.

Figure 35:
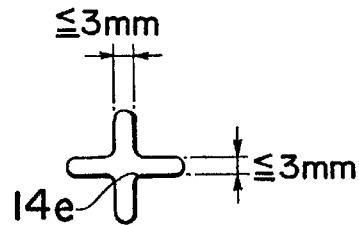
FIGS. 35 to 37 illustrate different shapes of positioning holes employed in the reinforcement or intermediate panel of the side center pillar shown in FIG. 27.
Figure 36:
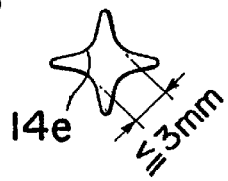
Figure 37:
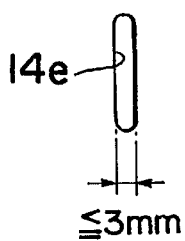

Each of the positioning holes 14e defined in the metallic reinforcing member 45 has a diameter preferably not greater than 3 mm so that any possible leakage of the filling material forming the filler sheet 10 into the closed inner volume 2b through the positioning holes 14 can be minimized. It is to be noted that each of the positioning holes 14e may not be limited to a round shape, but may be of a shape such as shown in any of FIGS. 35 to 37. Where the shape shown in any of FIGS. 35 to 37 is employed for each positioning hole 14e, a portion or portions indicated by a specific size in any of FIGS. 35 to 37 should have the size of not greater than 3 mm as specified therein.

Figure 38:
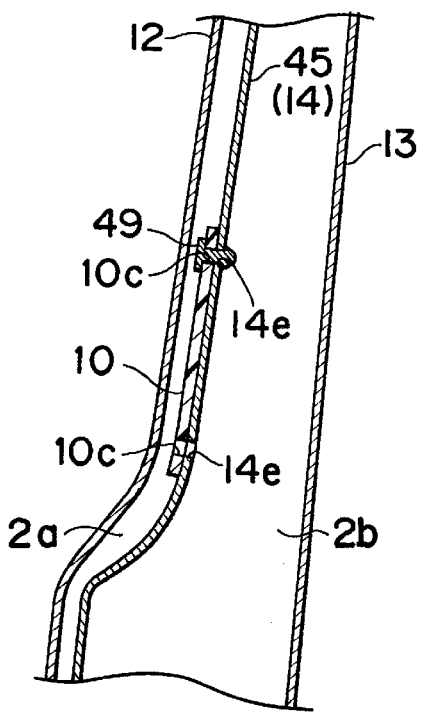
FIG. 38 is a fragmentary longitudinal sectional view of the side center pillar, showing an example in which a sheet of filling material eventually forming the filler is retained in position by a clip.

Furthermore, where the perforations 10c are employed as shown in FIG. 34, placement of the filler sheet 10 to the surface of the metallic reinforcing member 45 with the perforations 10c aligned with the respective positioning holes 14e may be followed by tapping at least one anchor pin or clip 49 into the corresponding perforation 10c and then into the associated positioning hole 14e to allow the filler sheet 10 to be firmly retained by the metallic reinforcing member 45 as shown in FIG. 38. In such case, the attendant worker can perform an inspection to ascertain if the filler sheet 10 has been set in the right position relative to the metallic reinforcing member 45, depending on whether or not a free end of the anchoring pin or clip 49 having been so tapped protrudes into the closed inner volume 2b.

Although no inspection is possible, positioning projections or recesses may be employed in the metallic reinforcing member 45 in place of the positioning holes 14e. Alternatively, suitable markings may be employed in place of the positioning holes 14e.

Although in the foregoing fifth embodiment of the present invention, only the filler 11 is provided inside the side center pillar 2, two or more fillers may be employed and, in that case, a partial reinforcement having its opposite ends formed with respective extensions protruding in a direction lengthwise of the side center pillar 2 may be provided between the two fillers.

Even the concept embodied in FIGS. 26 to 38 can be equally applied to any other suitable frame structure of a closed-box section. Also, although the upper and lower reinforcing members 41 and 42 have been described as made of a steel, they may be made of wood, i.e., may be employed in the form a wooden plate.

Hereinafter, the present invention will be demonstrated by way of non-limiting examples.

EXAMPLES

In the first place, six types of filling materials, listed in Table 1 below and that would supposedly be usable to form the filler sheet 10 which, when expanded, forms the filler 11, were tested as to determine its fundamental physical characteristics. In Table 1, the density at room temperatures (about 20° C.), the average compressive strength and the maximum bending strength of each of those six filling materials were examined and shown.

In Table 1, the expandable urethane resin used is of a kind having a hardness of 8 kg/cm², and the reinforcement used is in the form of a steel plate of 1 mm in thickness that is generally employed within the hollow of the frame structure (which steel plate is hereinafter referred to as SPCC. In the examples that follow, the steel plates referred to therein are all SPCC.)

TABLE 1

| Types of Materials | Density (g/cm³) | Ave. Comp. Strength (MPa) | Max. Bending Strength (MPa) |
| --- | --- | --- | --- |
| Expandable Urethane | 0.09 | 0.6 | — |
| Porous Aluminum | 0.29 | 1.9 | 2.4 |
| Wood | 0.41 | 2.5 | 59.2 |
| Epoxy Resin A | 0.50 | 3.0 | 3.7 |
| Epoxy Resin B | 0.50 | 9.0 | 11.0 |
| Solid Aluminum | 2.67 | 234 | 586 |
| Reinforcement (Steel) | 0.61 | — | — |

The density of the reinforcement listed in Table 1 is calculated in terms of a converted density within frame from the weight of the reinforcement, disposed within the hollow of the frame structure as will be described later and shown in FIG. 40, and the volume of a frame corresponding to a portion where the reinforcement is disposed. The average compressive strength of the expandable urethane listed in Table 1 and the average compressive strength and the maximum bending strength of the reinforcement listed in Table 1 could not be measured because of the respective values too small.

The average compressive strength of each of the filling materials was measured by the following manner. A cubic sample, 30×30×30 mm, of each filling material was first prepared, applying a compressive load in one direction to the cubic sample at a rate of 10 mm/min, and determining an average value of loads required for the cubic sample to displace within the range of 0 to 8 mm as shown in FIG. 39, which average value is used as the average compressive strength.

The maximum bending strength of each filling material was measured by means of a three-point bending test using an autographic recording machine in the following manner. A rectangular plate-shaped sample, 50×150×10 mm in size, of each filling material was first prepared and was supported at two points spaced 80 mm from each other. A pressure applying element of R8 is applied to a point intermediate between the support points in a direction counter to the direction in which the support points act, at a rate of 10 mm/min. The autographic recording machine produced a load versus displacement diagram from which the maximum bending strength was calculated.

The filling material that can be advantageously employed in the practice of the present invention to form the filler that is eventually disposed within the hollow of the frame structure should have a density not greater than 1.0 g/cm³ and preferably not greater than 0.6 g/cm³, in terms of cost and weight reduction.

Thereafter, the energy absorption characteristic of the frame structure was tested by filling each of the filling materials into a predetermined portion of the hollow of the frame structure. For this purpose, the frame structure FR of the construction shown in FIG. 40 was assembled, using panel members in the form of a steel plate of 1 mm in thickness having a tensile strength of 292 N/mm², a yielding point of 147 N/mm², and an elongation of 50.4%. Specifically, as shown in FIG. 40, a panel member Po of a generally U-sectioned configuration and having a pair of laterally outwardly protruding flanges Lf was joined together with a flat panel member Pi with the flanges Lf of the panel member Po spot-welded at the pitch of 60 mm, to thereby complete the frame structure FR.

Figure 40:
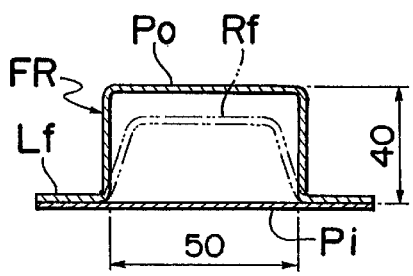
FIG. 40 is a schematic transverse sectional view of the frame structure used during a three-point bending test.

In the case of the frame structure wherein a reinforcement Rf is disposed within the generally rectangular sectioned hollow as shown by the phantom line in FIG. 40, the same material as that of each of the panel members Pi and Po was used for the reinforcement Rf. This reinforcement Rf has a pair of laterally outwardly protruding flanges (not shown) sandwiched between the respective flanges of the panel members Pi and Po and were then spot-welded in a triple layered fashion.

After each of the filling materials listed in Table 1 had been filled in a predetermined portion of the hollow of a respective sample frame structure identical in structure to the frame structure FR shown in FIG. 40, the sample frame structures were subjected to physical tests to determine the relation between the average compressive, strength or the maximum bending strength and the energy absorption.

Figure 41:
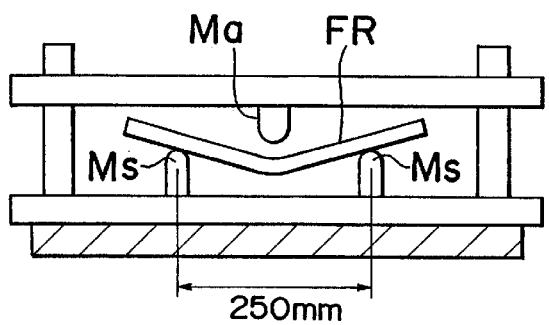
FIG. 41 is a schematic diagram showing a testing machine used to perform the static three-point bending test of the frame structure.
Figure 42:
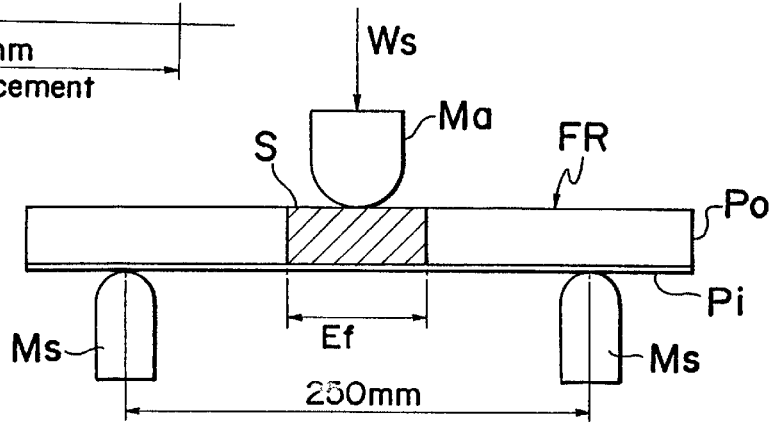
FIG. 42 is a schematic diagram showing a portion of the testing machine of FIG. 41 on an enlarged scale.

Specifically, each sample frame structure having the respective filler material disposed therein was subjected to a static three-point bending test in a manner as shown in FIG. 41 which schematically illustrates a bending strength testing machine. The details of the bending strength testing machine shown in FIG. 41 is shown in FIG. 42 on a partially enlarged scale.

Figure 43:
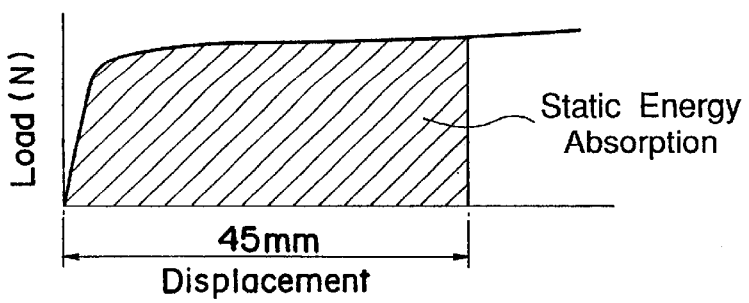
FIG. 43 is a graph showing the static bending load of the frame structure versus displacement, used to explain the static energy absorption.

The filling material S was filled within the hollow of each sample frame structure FR of a cross-sectional shape shown by the solid lines in FIG. 39 and having a predetermined length, over a distance Ef which is 50 to 300 mm. Thereafter, using a universal testing machine, a static load Ws was applied to an intermediate point of each sample frame structure FR through a pressure applying element Ma so that the load versus displacement characteristic within the displacement of 0 to 44 mm was measured as shown in FIG. 43 to obtain the static energy absorption.

Figure 44:
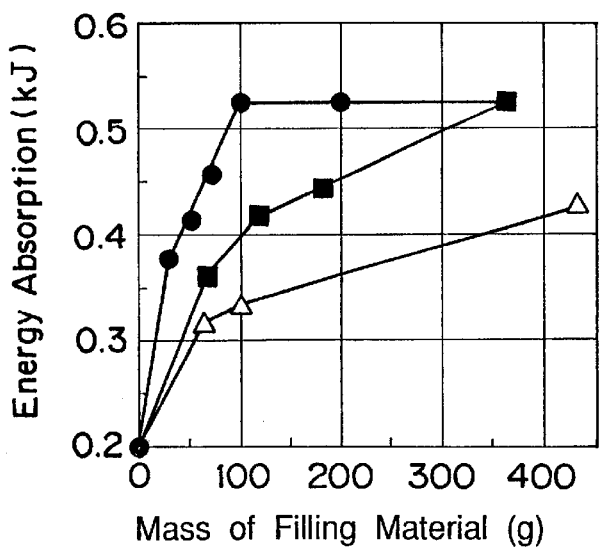
FIG. 44 is a graph showing the relation between the mass of filling material and the static energy absorption exhibited by the frame structure.

Respective results of the tests are shown in FIGS. 44 to 47. FIG. 44 illustrates the relationship between the mass of the filling material used and the energy absorption. In this graph of FIG. 44, black round markings represent change of the energy absorption with change of the mass of wood used as the filling material S within the sample frame structure; black square markings represent change of the energy absorption with change of the mass of epoxy resin A used as the filling material S and expanded within the sample frame structure; and white triangular, markings represent change of the energy absorption with change of the mass of the steel reinforcement of 1.0 mm in thickness used in place of the filler in the sample frame structure. For comparison purpose, change of the energy absorption which change of the mass of the steel reinforcement of 1.6 mm in thickness and with no filler employed is shown by white round markings.

Note that no filler was employed in the sample frame structure employing the steel reinforcement of 1.0 mm in thickness which are represented by the white triangular markings in the graph of FIG. 44. However, for ;this steel reinforcement, the mass of filling material used to represent the axis of abscissas in the graph of FIG. 44 should read as representing the mass of the steel reinforcement divided by the volume within the cross-section of the sample frame structure including the steel reinforcement in place of the filler while the numerical values listed along the axis of abscissas in the graph of FIG. 4 should be read as representing the length of the reinforcement tested.

As can readily be see from the graph of FIG. 44, the wood and the epoxy resin A have exhibited increase in energy absorption with increase of the mass of the respective filling material S and exhibited a maximum value at which support elements Ms of the testing machine supporting opposite ends of the respective sample frame structure from below were collapsed. Where the filling material S such as wood and epoxy resin was used, a far smaller mass (amount) of the filling material is sufficient for a given energy absorption as compared with that in the case of the sample frame structure provided only with the reinforcement Rf.

As such, it has been ascertained that the use of the filling material S within the frame structure FR is effective to considerably increase the energy absorption of such frame structure FR as compared with the frame structure provided only with the reinforcement Rf.

Figure 45:
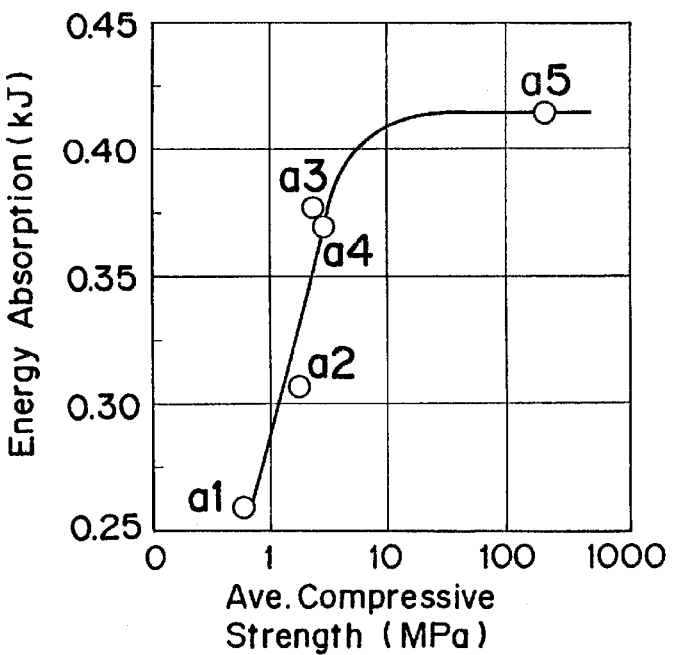
FIG. 45 is a graph showing the relation between the average compressive strength of the filler and the static energy absorption of the frame structure.

FIG. 45 illustrates the relationship between the average compressive strength of each of the filling materials S and the energy absorption, wherein the axis of abscissas represents a logarithmic value. During the measurement, the length EF of the filling material S filled within the respective sample frame structure was chosen 50 mm. It is pointed out that if the length EF is smaller than this specific value, say, 50 mm, the correlation of the energy absorption exhibited by the respective filling material S with the compressive strength thereof tends to be intensified considerably without the filling material S being virtually bent.

In the graph of FIG. 45, plots a1, a2, a3, a4 and a5 represent those exhibited by urethane resin, porous aluminum, wood, epoxy resin A and solid aluminum, respectively.

As can be seen from the graph of FIG. 45, although the energy absorption exhibited by the respective sample frame structure FR increases with increase of the average compressive strength of the filling material S, the extent to which the energy absorption increases tends to saturate when the average compressive strength exceeds 4 MPa. In particular, when the average compressive strength exceeds 5 MPa, the extent to which the energy absorption increases saturates steadily and the energy absorption about equal to the maximum value thereof can be steadily obtained.

Figure 46:
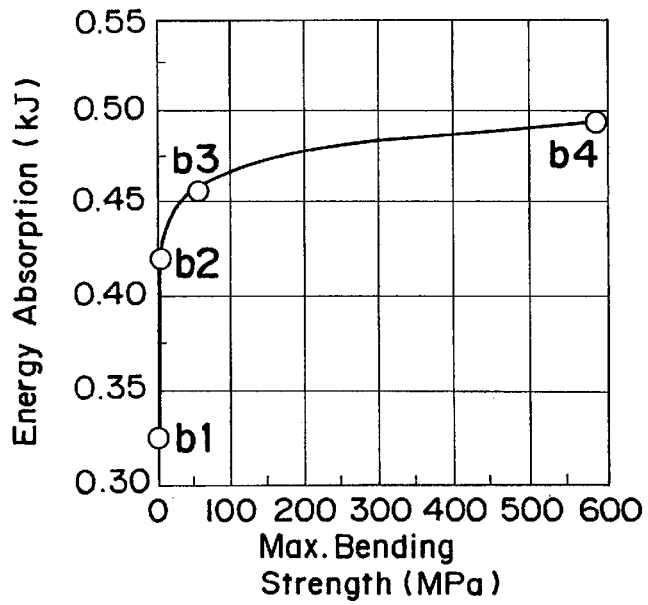
FIG. 46 is a graph showing the relation between the maximum bending strength of the filler and the static energy absorption of the frame structure.
Figure 47:
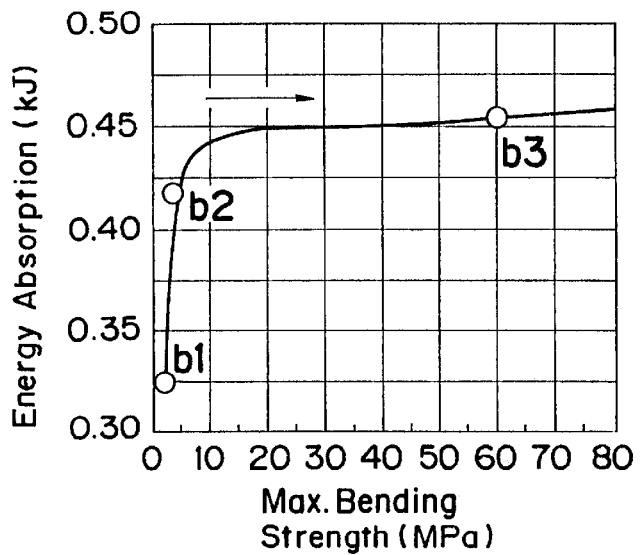
FIG. 47 is a graph showing a portion of the graph of FIG. 46 on an enlarged scale.

FIG. 46 illustrates the relationship between the maximum bending strength and the energy absorption exhibited by the filling material S, and FIG. 47 illustrates, on an enlarged scale, a portion of the graph of FIG. 46 corresponding to a region of the maximum bending strength not greater than 80 MPa. During this measurement, the length of the filling material S used was chosen 100 mm. If the length EF of the filling material is increased to about 100 mm, the bending strength of the filling material tested contributes to increase of the energy absorption. It is to be noted that plots b1 to b4 shown therein represent those exhibited by porous aluminum, epoxy resin A, wood and solid aluminum.

As can be seen from the respective graphs of FIGS. 46 and 47, although the energy absorption increase with increase of the maximum bending strength of the respective filler material S, the extent to which the energy absorption of the respective sample frame structure FR increases tends to saturate when the maximum bending strength exceeds 10 MPa (See particularly to FIG. 47). In other words, if the maximum bending strength is equal to or greater than 10 MPa, the energy absorption about equal to the maximum value thereof can be obtained. In particular, when the maximum bending strength reaches 60 MPa or greater, the extent to which the energy absorption increases saturates steadily and the energy absorption about equal to the maximum value thereof can be steadily obtained.

Figure 48:
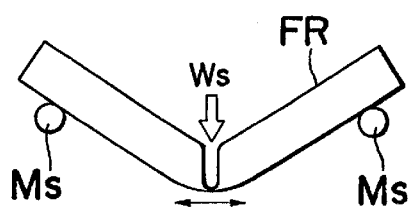
FIG. 48 is an explanatory diagram schematically showing a bending of the frame structure without the filler used therein.
Figure 49:
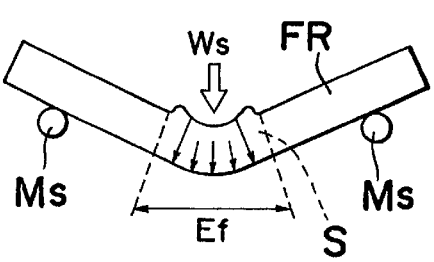
FIG. 49 is an explanatory diagram schematically showing a bending of the frame structure with the filler used therein.

In the foregoing tests conducted to determine the static energy absorptivity, where no filling material is filled within the hollow of the frame structure, the respective sample frame structure FR considerably deforms at a local point where the load Ws is applied as shown in FIG. 48. In contrast thereto, where the filling material is filled within the hollow of the frame structure, the input load Ws can be distributed a peripheral portion of the respective sample frame structure FR, that is adjacent the filling material S filled in the length Ef, through the filling material S so filled. Accordingly, the use of the filling material within the hollow of the frame structure is effective to avoid an occurrence of a considerable local deformation of the frame structure, but to allow the frame structure to deform over a substantial range. As such, it appears that the energy absorption may drastically increase.

When the energy absorption of the respective filling material S itself was measured, it has been found that the energy absorption of the respective filling material S itself was not higher than 7% of the total energy absorption. In view of this, it can readily be understood that the extent to which the energy absorption increases as a result of the use of the respective filling material S within the sample frame structure FR is considerably largely attributable to the load dispersing effect brought about by the use of the filling material S, rather than the energy absorptivity of the filling material S itself.

When the frame structure filled with the wood of a kind exhibiting the upper limit of the energy absorption in the graph of FIG. 44 was inspected with naked eyes after the test, end portions of the frame structure supported by the machine support elements Ms were substantially completely collapsed. It appears that the maximum energy absorption of the frame structure FR tested has resulted from the collapse of the end portions of the frame structure FR held in contact with the machine support elements Ms. Accordingly, in such case, it can be sand that the role of the filling material S is to disperse the input load Ws to the points of support of the frame structure.

The sample frame structures each filled with the different filling material in a length EF which is 50 mm were tested and inspected with naked eyes to determine the extent to which the respective sample frame structure was collapsed during the test. As a result, each sample frame structure exhibiting a relatively low energy absorption (i.e., the sample frame structure provided only with the reinforcement RF, the sample frame structure filled with the urethane resin A, and the sample frame structure filled with the porous aluminum) has shown that the cross section thereof was substantially completely collapsed at points thereof where the load was inputted, whereas each sample frame structure exhibiting a relatively high energy absorption (i.e., the sample frame structures filled with epoxy resin, wood and solid aluminum, respectively) has shown that the cross section thereof was not collapsed so much.

The collapse of the frame section at the load inputting points is closely affected by the compressive strength of the filling material S and, as discussed hereinabove, the energy absorption increases with increase of the average compressive strength of the filling material S. In particular, the energy absorption saturates at about 4 MPa of the average compressive strength and saturates steadily at about 5 MPa of the average compressive strength. See the graph of FIG. 45.

As such, the collapse of the frame section largely affects the energy absorbing performance. Specifically, a local deformation tends to be accelerated as a result of stress set-up brought about by collapse of the frame section, resulting in breakage of the frame structure FR without the sufficient energy absorption secured.

The compressive load applied to the filling material S filled within he frame structure FR directly acts particularly on the load inputting side and, therefore, the average compressive strength of the filling material S is preferably maintained at a value (equal to or greater than 4 MPa) sufficient to avoid a possible collapse of the frame section at the lead input sides.

Also, as discussed hereinbefore, if the length Ef of the filling material S filled within the frame structure is of a value greater than a predetermined length, the energy absorption makes a difference even though the average compressive strength, of the filling material S remains substantially equal. When the length Ef was chosen 100 mm, inspection of the cross-section of the frame structure, filled with the epoxy resin A which had exhibited a relatively small energy absorption, with naked eyes has indicated the presence of cracking in the filling material (i.e., the epoxy resin). The occurrence of the cracking has considerably affected by the maximum bending strength and, with increase of this maximum bending strength, the energy absorption increased. Specifically, the energy absorption saturated at about 10 MPa of the maximum bending strength and steadily saturated at about 60 MPa as clearly shown in the graphs of FIGS. 46 and 47.

The bending load applied to the filling material S filled within the frame structure FR directly acts particularly on the counter-load inputting side and, therefore, the maximum bending strength of the filling material S is preferably maintained at a value (equal to or greater than 10 MPa) sufficient to avoid a possible occurrence of cracking in the filling material at the counter-load inputting side.

From the foregoing description, where the filling material is to be filled within the frame structure FR, it is preferred that the filling material S is of a multi-layered structure including a plurality of filler layers of different components and one of the fillers layers having an average compressive strength equal to or greater than a predetermined value (at least 4 MPa) is to be disposed on the load inputting side whereas another one of the filler layers having a maximum bending strength equal to or greater than a predetermined value (at least 10 MPa) is to be disposed on the counter-load acting side. This design is effective to very efficiently increase the energy absorption of the frame structure FR.

Figure 50:
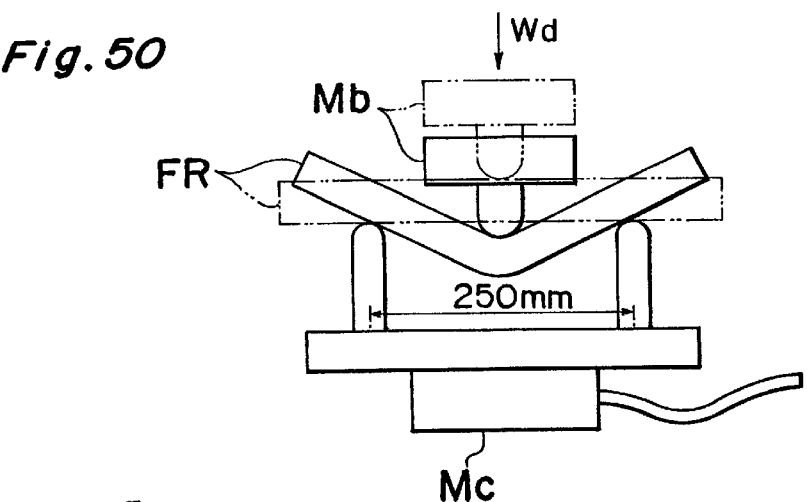
FIG. 50 is a schematic diagram showing a testing machine used to perform a dynamic three-point bending test on the frame structure.

Following the above discussed static three-point bending test, a dynamic three-point bending test was conducted on the sample frame structures. FIG. 50 schematically illustrates a testing machine used to perform the dynamic three-point bending test on the sample frame structures FR.

Figure 51:
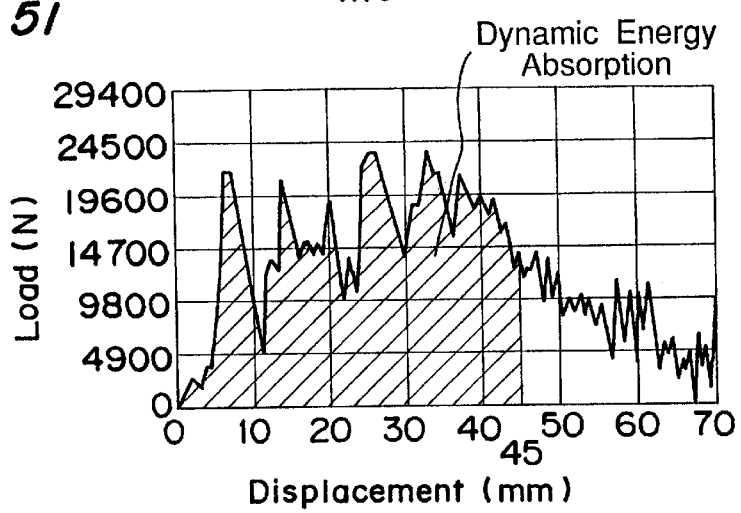
FIG. 51 is a graph showing the relation between the dynamic bending load of the frame structure and the displacement, used to explain the dynamic energy absorption.

Within the hollow of the frame structure FR of a predetermined length and having a cross-sectional shape shown by the solid lines in FIG. 40, the filling material S was filled in a length Ef which is 50 to 300 mm in a manner similar to that during the static three-point bending test. Thereafter, using a falling weight Mb capable of applying an impact load Wd, the amount of deformation of the respective sample frame structure FR which takes place when the impact load Wd is applied to a point intermediate of the length of the frame structure FR was measured with the applied impact load being measured by a load cell Mc, to thereby determine the energy absorption occurring when the frame structure was deformed in a displacement within the range of 0 to 45 mm as shown in FIG. 51.

Figure 52:
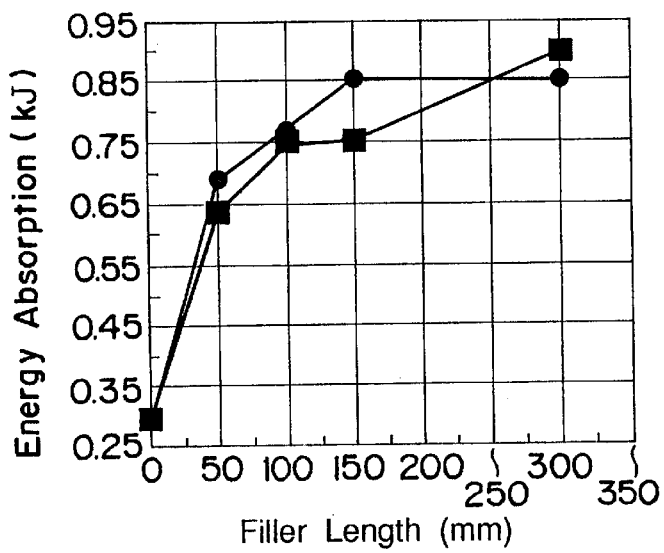
FIG. 52 is a graph showing the relation between the length of the filler and the dynamic energy absorption of the frame structure.

FIG. 52 illustrates the relationship between the length of the filling material and the energy absorption measured during the dynamic three-point bending test. In the graph of FIG. 52, black round markings represent change exhibited by wood filled as the filling material, and black square marking represent change exhibited by epoxy resin A filled as the filling material.

As can be readily understood from the graph of FIG. 52, as is the case with the measurement during the static three-point bending test, so far as the filling material was employed in the form of wood and epoxy resin A, the energy absorption increased with increase of the mass of the filling material S filled, and the upper limit of the energy absorption was observed at 0,85 kJ. As such, with respect to the dynamic load Wd, it has been ascertained filling of the filling material S within the hollow of the sample frame structure FR is effective to increase the energy absorption of the respective sample frame structure FR.

Comparing the measurement with the dynamic load Wd with the measurement with the static load Ws, the energy absorption exhibited as a result of application of the dynamic load Wd is larger than that as a result of application of the static load Ws and was found to be about 1.7 of the energy absorption exhibited as a result of application of the static load Ws.

Reviewing the respective data on the energy absorption obtained as a result of the application of the static load Ws and the dynamic load Wd, it has been ascertained there was a very high correlation therebetween when the ratio of the energy absorption, exhibited as a result of application of the static load Ws, and that exhibited as a result of application of the dynamic load Wd. Accordingly, consideration made on the energy absorption exhibited as a result of application of the static load Ws appears to be basically equally applicable to dealing with the energy absorption exhibited as a result of application of the dynamic load Wd.

Figure 53:
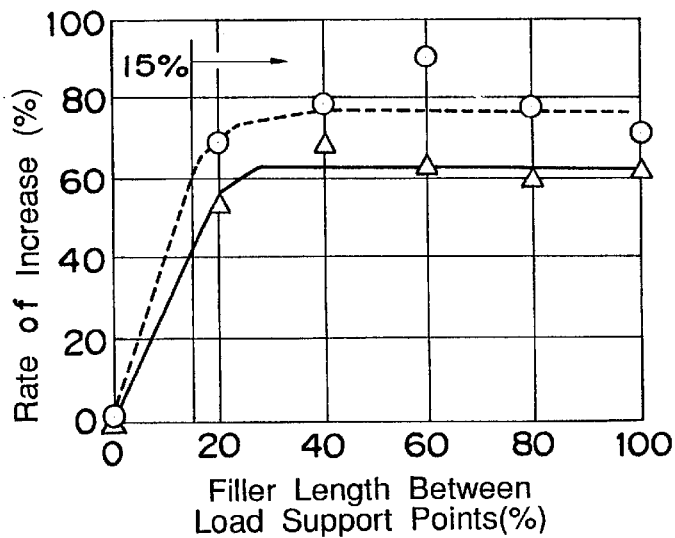
FIG. 53 is a graph showing the relation between the length of the filler and the rate of increase of energy absorption during the dynamic three- point bending test.

FIG. 53 illustrates the graph showing the relation between the rate of increase of the energy absorption and the length of the filling material S filled (the ratio of the length of the filling material relative to the span between the load bearing points), that is applicable where only the reinforcement Rf is provided within the hollow of the frame structure. In this graph, white round markings represent change exhibited by wood used as the filling material and white triangular makings represent that by epoxy resin A used as the filling material.

As can be clearly understood from the graph of FIG. 53, so far as the filling material was employed in the form of wood and epoxy resin A, the energy absorption increases with increase of the length of the filling material S filled, but saturates substantially at about 15%. In other words, if the length of the filling material S filled is equal to or greater than 15% relative to the span between the load bearing points, substantially the maximum energy absorption can be obtained. Accordingly, the length of the filling material S to be filled within the hollow of the frame member is preferably equal to or greater than 15% of the span of the load bearing point.

Figure 54:
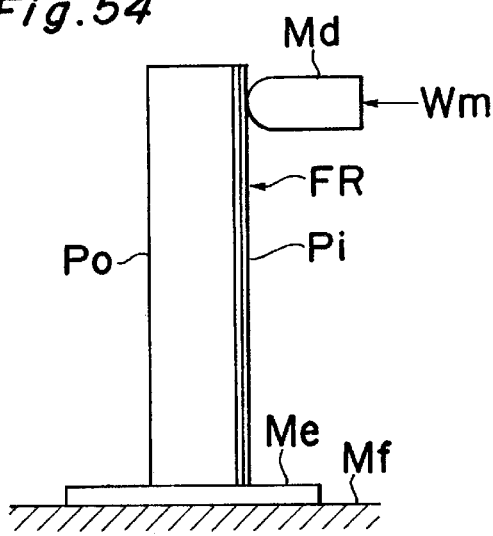
FIG. 54 is a schematic diagram showing a testing machine used to perform a static cantilever bending test on the frame structure.
Figure 55:
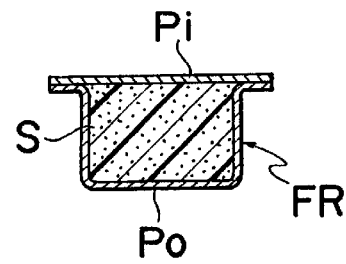
FIG. 55 is a schematic transverse sectional view of the frame structure used during the static cantilever bending test.

FIG. 54 schematically illustrates a testing machine used to perform a static cantilever bending test. This test is carried in such a manner that the frame structure FR of a predetermined length and having a cross-sectional shape shown in FIG. 55 with the filling material S filled within the hollow thereof is fixedly supported upright on a support plate Me which is in turn fixed on a machine base Mf. Using a universal testing machine, a static load Wm is applied externally to a free end portion of the frame structure FR remote from the support plate Me, in a direction from the panel member Pi; forming a part of the frame structure FR, towards the panel member Po also forming a part of the frame structure. The relation between the bending angle (calculated based on the displacement of the point of application of the load and the distance from the base end to the load applying point) and the applied load is measured to determine the maximum bending moment and the static energy absorption.

Figure 56:
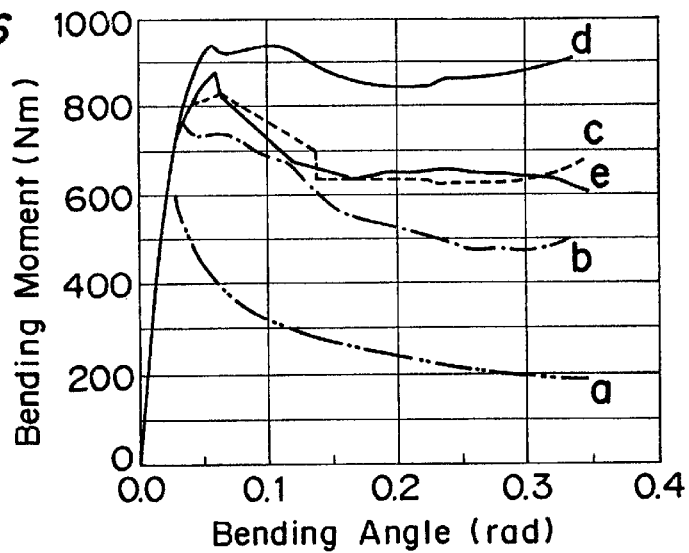
FIG. 56 is a graph showing the relation between the bending angle and the bending moment exhibited by the frame structure depending on the type of the different fillers.

FIG. 56 illustrates the graph showing the relationship between the bending angle of the respective frame structure tested with each filling material filled therein and the bending moment exhibited thereby. Referring to the graph of FIG. 56, a curve a represents a characteristic of the frame structure without the filling material (only the steel frame structure); a curve b represents a characteristic of the frame structure filled with the epoxy resin A; a curve c represents a characteristic of the frame structure filled with the epoxy resin B; a curve d represents a characteristic of the frame structure filled with the epoxy resin B and also with the adhesive layer (a bodyshell sealer having a shear strength of 7.3 MPa) intervening between the panel members Po and Pi of the frame structure; and a curve e represents a characteristic of the frame structure filled with the wood (pine).

As can be seen from the graph of FIG. 56, all of those curves a to e indicate that as the bending angle increases to a certain extent, the bending moment considerably increases with increase of the bending angle. Specifically, the curves a to c and e show that the bending moment attains a peak value at a certain bending angle and subsequently decreases down from the peak value with further increase of the bending angle. This decrease from the peak value is particularly considerable in the case of the frame structure without the filling material filled, that is, only the steel frame structure, as shown by the curve a.

In contrast thereto, in the case of the frame structure filled with the epoxy resin B and the adhesive layer, it is observed from the curve d that even after the bending moment has abruptly increased to a peak value, decrease of the bending moment down from the peak value with further increase of the bending angle is not so considerable as that exhibited by any of the curves a to c and e, maintaining at a relatively high value. Also, the maximum bending moment exhibited by the frame structure with the epoxy resin B and the adhesive layer filled therein is the largest of all frame structures tested. Accordingly, as compared with the curve c exhibited by the frame structure filled only with the same epoxy resin B', there is a considerable difference between the frame structure, with the epoxy resin B and the adhesive layer filled therein, and that filled only with the epoxy resin B in respect to the drift relative to the bending angle and the magnitude of the maximum bending moment.

Thus, it will readily be seen that even though the same filling material is used, the bending moment of the frame structure can be considerably increased if the filling material is fixed to the panel members of the frame structure with the adhesive material.

Figure 57:
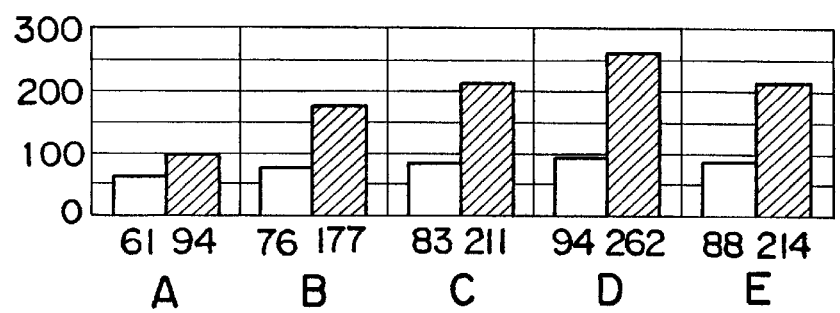
FIG. 57 is a graph showing the relation between the maximum bending moment and the energy absorption exhibited by the frame structure depending on the type of the different fillers.

FIG. 57 illustrates a bar graph showing the relation between the maximum bending moment (Nm) and the energy absorption (J) exhibited by the frame structures filled with the different filling materials as is the case with FIG. 56. In this bar graph, columns A to E represent, respectively, the frame structures which have exhibited the associated curves a to e shown in FIG. 56. Also, in each of those columns A to E in the bar graph of FIG. 57, the numerical value immediately below the blank bar represents the maximum bending moment (Nm) and the numerical value immediately below the hatched bar represents the energy absorption (J) of the respective frame structure.

As can be better understood from the graph of FIG. 57, the energy absorption of the frame is the highest with the frame structure filled with the epoxy resin and the adhesive layer (See column D) and has made a clear difference with that exhibited by the frame structure utilizing the same filling material as shown in column C. Accordingly, it will readily be seen that even though the same filling material is used, the energy absorption of the frame structure can be considerably increased if the filling material is fixed to the panel members of the frame structure with the adhesive material.

Figure 58:
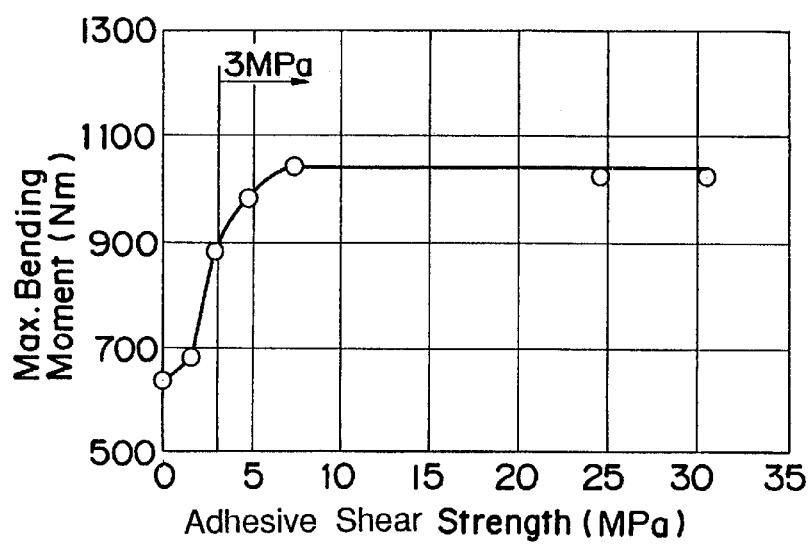
FIG. 58 is a graph showing the relation between the adhesive shear strength of the adhesive layer and the maximum bending moment.

FIG. 58 illustrates the graph showing the relationship between the adhesive shear strength of the adhesive layer and the maximum bending moment. The graph of FIG. 58 clearly indicates that with increase of the adhesive shear strength of the adhesive layer, the maximum moment increases, but when the adhesive shear strength exceeds 3 MPa, the extent of increase (the gradient of a curve shown therein) of the maximum bending moment is somewhat retarded as compared with that before the adhesive shear strength attains 3 MPa. In other words, if the adhesive shear strength of the adhesive layer is equal to or greater than 3 MPa, the maximum bending moment with which the frame structure can withstand can be very efficiently increased to a sufficient value, making it possible to secure a high energy absorptivity. accordingly, the preferred adhesive shear strength of the adhesive layer is equal to or greater than 3 MPa in the practice of the present invention.

Also, if the adhesive shear strength further increases to a value equal to or greater than 7 MPa, the extent of increase of the maximum bending moment saturates. In other words, if the adhesive shear strength is equal to or greater than 7 MPa, the bending moment about equal to the maximum value can be obtained. Accordingly, the adhesive shear strength which is equal to or greater than 7 MPa is furthermore preferred.

The adhesive shear strength referred to hereinabove and hereinafter was measured according to JIS K 6850 which stipulates a "Testing Method for Shear Strength of Adhesive Bonds by Tensile Loading" and shown in FIG. 59. For the purpose of the present invention, the adhesive shear strength of each of the filling materials was measured in the manner which will now be described with reference to FIG. 519.

Figure 59:
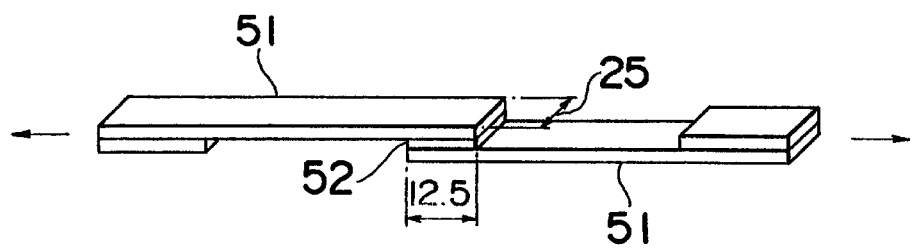
FIG. 59 is an explanatory diagram showing a method of measuring the adhesive shear strength.

As shown in FIG. 59, two rectangular steel plates 51 to be bonded together, each 25 mm in width and 1.6 mm in thickness, were overlapped at one end thereof with an expandable filling material 52 sandwiched between the respective ends of the steel plates 51. The overlapping ends of the steel plates 51 were clamped to allow the sandwiched expandable filling material 52 to represent a layer of 0.5 mm in thickness and run a distance of 12.5 mm in a direction lengthwise of the plates 51. The assembly was then heated cyclically at 150° C. for 30 minutes, then at 140° C. for 20 minutes and finally at 140° C. for 20 minutes, having simulated the drying process in which the automobile bodyshell is, after having been dipped in the electrophoretic paint bath, dried on an automobile production line. During this heating process, the filling material 52 was allowed to expand. Thereafter, burrs of the expanded filling material 52 flowing outwardly from the joint between the steel plates 51 were removed and was then subjected to the test to determine the adhesive shear strength. (The same applies regardless of whether the adhesive layer is employed or not.) A further static cantilever bending test similar to that described with reference to FIG. 54 was conducted to determine how the bending angle and the bending moment are affected depending on whether or not the filling material is filled in a portion of the frame member 60 of a cross-sectional shape shown in FIG. 60 and having a length of 240 mm. During this static cantilever bending test, the static load is applied in a direction from the outer panel 62 towards the inner panel 63.

Figure 60:
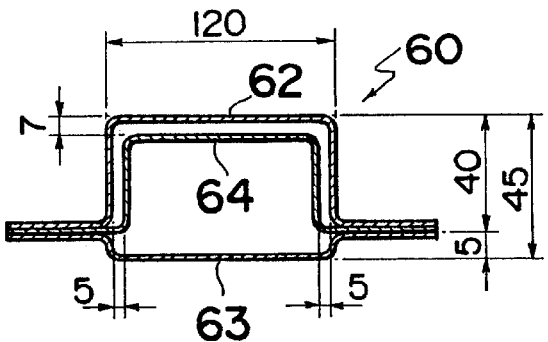
FIG. 60 is a transverse sectional view of the frame structure used during the static cantilever bending test for comparison between the frame structure with the filler used and that without the filler used.

More specifically, for the static cantilever bending test, the following four frame members each having a cross-sectional shape as shown in FIG. 60 were prepared:

Sample Frame Member A: The filling material is filled only in a closed outer volume defined between the outer panel 62 and the reinforcement or intermediate panel 64.

Sample Frame Member B: The filling material is filled only in a closed inner volume defined between the inner panel 63 and the reinforcement 64.

Sample Frame Member C: The filling material is filled in both the closed outer volume between the outer panel 62 and the reinforcement 64 and the closed inner: volume between the inner panel 63 and the reinforcement 64.

Sample Frame Member C: No filling material is filled.

Particulars common to all of those sample frame members A to C were:

Outer Panel 62: Made of[ s]teel and 0.7 mm in thickness
Inner Panel 63: Made of steel and 1.4 mm in thickness
Reinforcement 64: Made of steel and 1.2 mm in thickness The filling material employed in those sample frame members except for the sample frame member C was an epoxy resin (containing filler, rubber, hardening agent, foaming agent and others) of a kind having an average compressive strength of 9 MPa and a maximum bending strength of 10 MPa. The filling material employed in those sample frame members except for the sample frame member C had an adhesive shear strength of 10 MPa. A sheet of the filling material employed in those sample frame members except for the sample frame member C was, while retained in position within the closed outer volume, the closed inner volume or the both, was heated at 170° C. for 30 minutes to allow the filling material to expand to completely fill up the volume or volumes. The filling material filled in the closed outer volume weighed 117 gr. and that in the closed inner volume weighed 423 gr.

Figure 61:
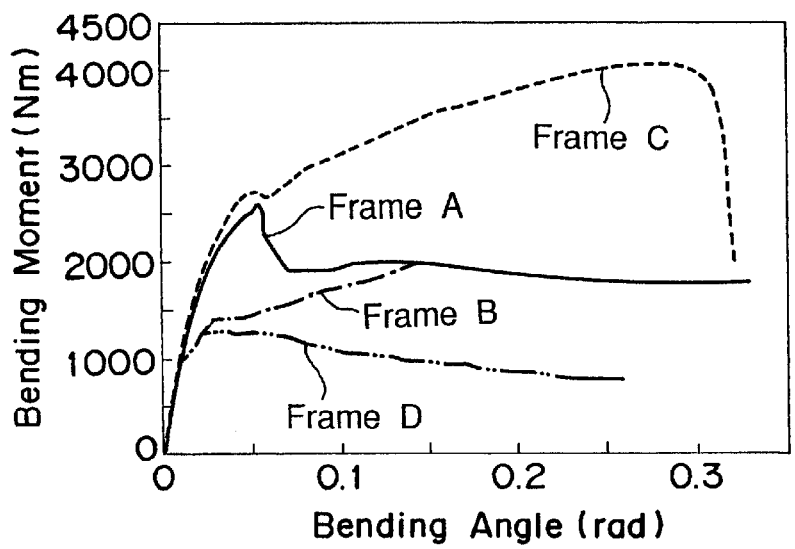
FIG. 61 is a graph showing the relation between the bending angle and the bending moment exhibited by the frame structures with and without the filler employed.
Figure 62:
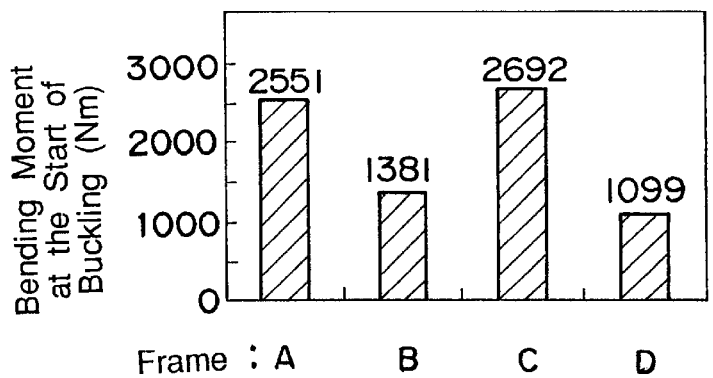
FIG. 62 is a graph showing the bending moments exhibited by the frame structures with and without the fillers employed, at the start of bucking thereof.
Figure 63:
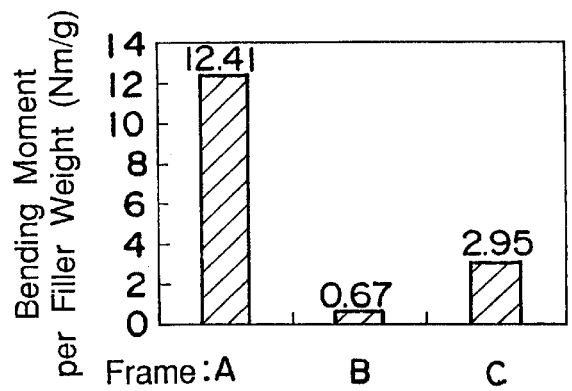
FIG. 63 is a graph showing the bending moments exhibited by the frame structures with and without the filler employed, per weight of the filling material used.

Results of the bending tests conducted to those sample frame members A to C are shown in the graphs of FIGS. 61 to 63. As can readily be seen from the graphs of FIGS. 61 to 63, the frame member-with the filling material completely filled within the entire cross-section thereof such as the sample frame member C has exhibited the largest maximum bending strength. However, so long as the maximum bending moment at the start of bucking is concerned, the frame member with the filling material filled within the closed outer volume such as the sample frame member A has shown no substantial difference with the frame member with the filling material completely filled within the entire cross-section thereof such as the sample frame member C. Accordingly, the use of the filling material within the closed outer volume between the outer panel 62 and the reinforcement 64 is particularly effective for a frame structure, such as the side center pillar, that requires bending to be suppressed and, thus, it is clear that the bending moment per gram weight of the filling material is very high. Thus, the use of the filling material within the closed outer volume between the outer panel 62 and the reinforcement 64 is economical and efficient in terms of the amount of the filling material used.

A still further static cantilever bending test similar to that described above was conducted to determine how the maximum bending moment, exhibited by the frame structure 60 with the filling material filled only in the closed outer volume (the volume between the outer panel 62 and the reinforcement 64), varied with change in spacing between the outer panel 62 and the reinforcement 64 of the frame structure 60 that was effected by changing the bending height of the reinforcement 64. It is, however, to be noted that to change the spacing between the outer panel 62 and the reinforcement 64, only a portion of such space shown in FIG. 60 as having a distance of 7 mm was changed and lateral opposite portions of such space shown in FIG. 60 as having a distance of 5 mm were not altered and remained 5 mm as indicated therein.

For comparison purpose, the frame structure having no filling material filled therein was tested in the same manner.

Figure 64:
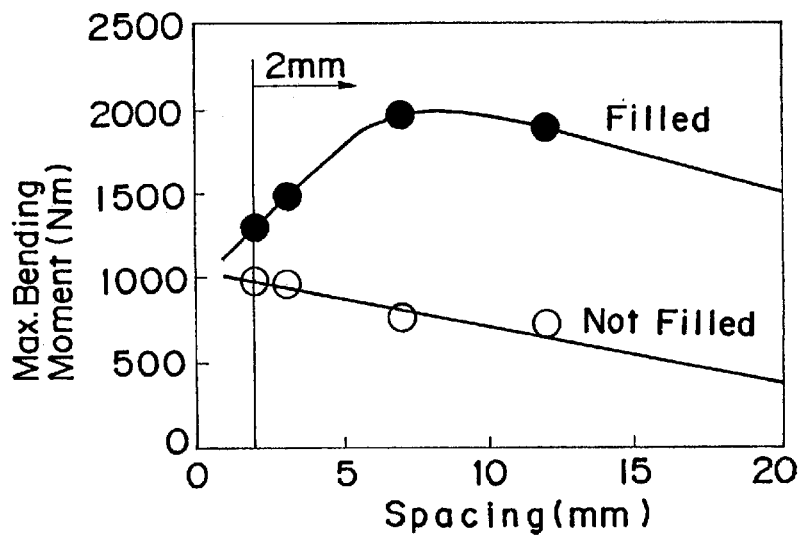
FIG. 64 is a graph showing the relation between the spacing between the outer panel and the reinforcement and the maximum bending moment, that is applicable where the filler is filled in between the outer panel and the reinforcement.

Results of the still further static cantilever bending tests are shown in the graph of FIG. 64. The graph of FIG. 64 makes it clear that while the frame structure having no filling material filled exhibited the maximum bending moment increasing with decrease of the spacing between the outer panel 62 and the reinforcement 64, the frame structure with the filling material filled in the closed outer volume exhibited that when the spacing decreased to a value smaller than 2 mm, no substantial difference from that exhibited by the frame structure having no filling material was found, but when the spacing was equal to or greater than 2 mm, the effect brought about by the use of the filling material could be obtained.

Figure 65A:
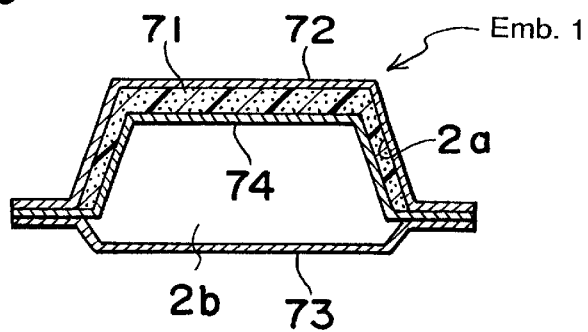
FIGS. 65A to 65C are schematic transverse sectional views of side center pillars tested during the static cantilever bending test, respectively.
Figure 65B:
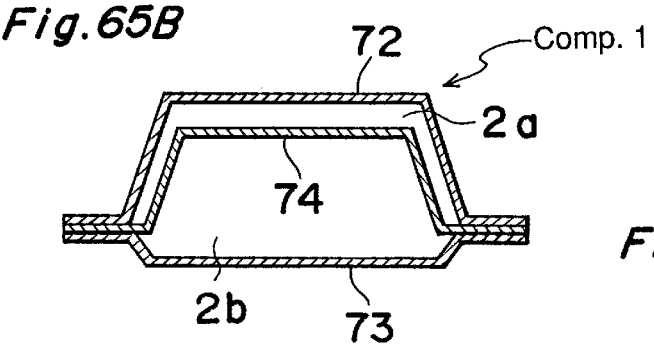
Figure 65C:
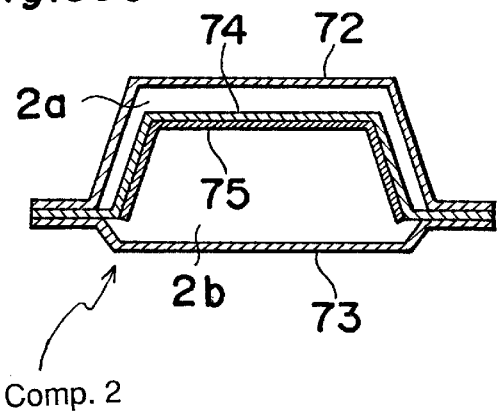

Apart from the foregoing various tests, a series of experiments have been conducted using various side center pillars shown in FIGS. 65A to 65C. The side center pillar shown in FIG. 65A, referred to as Emb. 1, made use of the frame structure designed according to the first preferred embodiment of the present invention, wherein the filter 71 is filled only in the closed outer volume 2a between the outer panel 72 and the reinforcement or intermediate panel 74. The outer and inner panels 72 and 73 were prepared from steel plates of 0.7 mm and 1.4 mm in thickness, respectively, and the reinforcement 74 was prepared from a steel plate of 1.2 mm in thickness. It is to be noted that the reinforcement 74 was of the same material as the outer panel 72, but had a rigidity higher than that of the outer panel 72 because of the thickness greater than that of the outer panel 72. The filler 71 employed had an adhesive shear strength of 10.5 MPa and was prepared from an epoxy resin (containing filler, rubber, hardening agent, foaming agent and others) of a kind having an average compressive strength of 13.0 MPa and a maximum bending strength of 13.5 MPa. After the assemblage of the side center pillar, the side center pillar was then heated cyclically at 150° C. for 30 minutes, then at 140° C. for 20 minutes and finally at 140° C. for 20 minutes, in a manner simulating the bodyshell drying process taking place subsequent to the electrophoretic painting, to cause the filling material to completely expand to complete the filler 71. The amount of the filler 71 used was 150 gr.

For comparison purpose, the two side center pillars, referred to as Comp. 1 and Comp. 2, were assembled as shown in FIGS. 65B and 65C, respectively. The side center pillar Comp. 1 made use of the frame structure similar to that used for the side center pillar Emb. 1, but having no filler filled as shown in FIG. 65B. The side center pillar Comp. 2 made use of the frame structure similar to that used for, the side center pillar Comp. 1, but differing therefrom in that the reinforcement 74 was prepared from a steel plate of 1.8 mm in thickness and an additional reinforcement 75 in the form of a steel plate of 1.2 mm in thickness was jointed to thee reinforcement 74 as shown in FIG. 65C.

The side center pillars Emb. 1, Comp. 1 and Comp. 2 were subjected to static cantilever bending tests in a manner described hereinbefore to determine the relationship between the bending angle and the bending moment of the respective side center pillar. During the test, the static load was applied in a direction from the outer panel 72 towards the inner panel 73.

Figure 66:
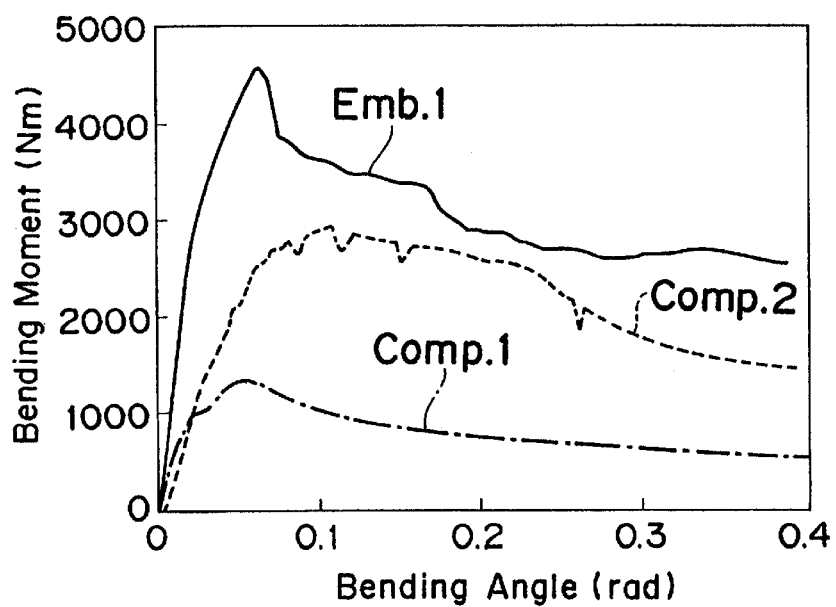
FIGS. 66 is a graph showing the relation between the bending angle and the bending moment exhibited by each of the side center pillars shown in FIGS. 65A to 65C, respectively.

Results of the center pillar bending tests are shown in the graph of FIG. 66. As can readily be seen from the graph of FIG. 66, the side center pillar Emb. 1 has shown a very high bending moment as compared with that of any one of the side center pillars Comp. 1 and Comp. 2 and contributes to a considerable reduction in weight as compared with the side center pillar Com. 2.

Figure 67A:
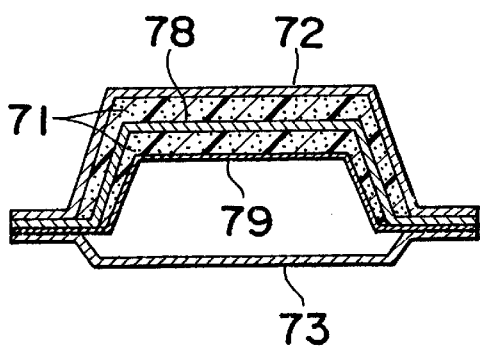
FIGS. 67A and 67B are schematic transverse sectional views showing the side center pillars of a type having the upper and lower reinforcing members.
Figure 67B:
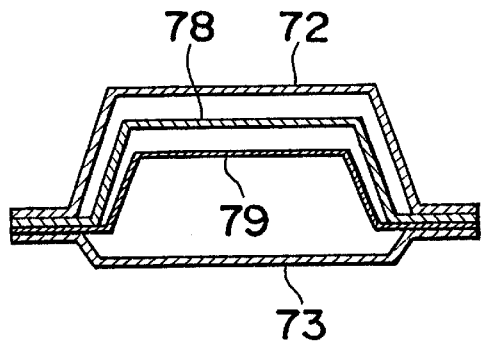

Further center pillar bending tests were conducted using the side center pillars Emb. 2 and Comp. 3 utilizing the respective frame structures shown in FIGS. 67A and 67B. In FIG. 67A, the side center pillar shown therein is of a design according to the embodiment of the present invention shown in and described with reference to FIGS. 6 and 7 and included the upper and lower reinforcement members (intermediate panel members) 78 and 79 that were spacedly overlapping each other at the belt-line region of the automobile bodyshell with the filler 71 filled in a space between the outer panel 72 and the lower end portion of the upper reinforcement member 78 and also in a space between the lower end portion of the upper reinforcement member 78 and an upper end portion of the lower reinforcement member 79. The outer panel 72 was prepared from a steel plate of 0.7 mm in thickness, the inner panel 73 was prepared from a steel plate of 1.2 mm in thickness, the upper reinforcement member 78 was prepared from a steel plate of 1.2 mm in thickness, and the lower reinforcement member 79 was prepared from a steel plate of 1.0 mm in thickness. Each of the reinforcements 71 were prepared from the same material as that employed during the center pillar bending tests discussed above. Prior to the filling material having been expanded in a simulated drying process discussed hereinbefore, respective sheets of the same filling material were stuck on the upper and lower reinforcement members 78 and 79, and the resultant side center pillar was dipped in the electrophoretic paint bath.

For comparison purpose, the side center pillar of the structure shown in FIG. 67B and referred to as Comp. 3 was used, which is similar to the frame structure shown in FIG. 67A, but no filler was employed.

Figure 68:
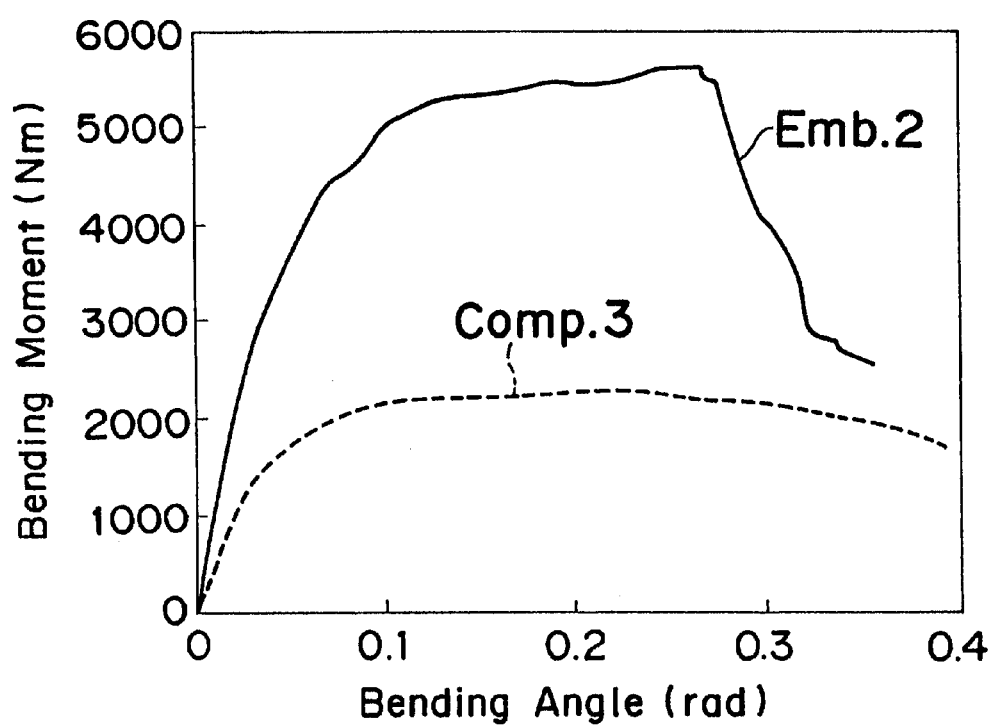
FIG. 68 is a graph; showing the relation between the bending angle and the bending moment exhibited by each of the side center pillars shown in FIGS. 67A and 67B, respectively.

Results of the center pillar bending tests conducted subject to the side center pillars Emb. 2 and. Comp. 3 are shown in the graph of FIG. 68. As can readily be seen from the graph of FIG. 68, the side center pillar Emb. 2 has shown a very high bending moment as compared with that of the side center pillar Comp. 3.

Then, the first filler made of the epoxy resin used in the center pillar bending tests and having an average compressive strength of 3.0 MPa, a maximum bending strength of 13.5 MPa and an adhesive shear strength of 10.5 MPa, and a second filler made of an extendable rubber material having a breaking strength of 0.014 MPa, an elongation at breakage of 200% and a density of 0.06 g/cm$^2$, all after having been foamed) were foamed in a manner similar to that described in the foregoing embodiments. In other words, respective sheets of the filing materials, which eventually formed the first and second fillers, were stuck on the reinforcement (it being, however, to be noted that the second filler was of a double-layered structure having an adhesive sheet and was stuck on the reinforcement through the adhesive sheet) during the assemblage of the side center pillar. After the assemblage of the side center pillar, the side center pillar was then heated cyclically in the simulated fashion subsequent to the electrophoretic painting, to cause the filling materials to completely expand to complete the fillers 71. By so doing, cracks appearing in the end portion of the first filler 71 could be completely covered up by the second filler, and even when the side center pillar was vibrated, there was no possibility that chips were not fall off from cracks in the end portion of the first filler.

Although the present invention has been described in connection with the preferred embodiments; thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. An automobile bodyshell frame structure comprising:
   a generally elongated first panel member;
   a generally elongated second panel member having opposite side edge portions connected to the first panel member to define a hollow between the first and second panel members; and
   a filler disposed within a portion of a cross-section of the hollow between the first and second panel members, said filler being provided on an inner surface of one of the first and second panel members and having at least one of an average compressive strength equal to or greater than 4 MPa and a maximum bending strength equal to or greater than 10 MPa; and
   a generally elongated intermediate panel member intervening between the first and second panel members, and wherein the filler is filed in a closed volume delimited between the intermediate panel member and once of the first and second panel members.

2. The frame structure as claimed in claim 1, wherein the filler has the average compressive strength equal to or greater than 4 MPa and the maximum bending strength equal to or greater than 10 MPa.

3. The frame structure as claimed in claim 2, wherein the average compressive strength is not smaller than 5 MPa and the maximum bending strength is not smaller than 60 MPa.

4. The frame structure as claimed in claim 1, wherein the average compressive strength is not smaller than 5 MPa and the maximum bending strength is not smaller than 60 MPa.

5. The frame structure as claimed in claim 1, wherein the intermediate panel member has at least one of a strength and a rigidity which is equal to or higher than one of the first and second panel members adjacent the filler.

6. The frame structure as claimed in claim 1, wherein the filler has a generally U-shaped cross-section and one of the first and second panel members adjacent the filler is spaced from the intermediate panel member a distance not smaller than 2 mm.

7. The frame structure as claimed in claim 1, further comprising at least one layer of adhesive material interposed between one of the first and second panel members and the filler for bonding the filler to such one of the first and second panel members.

8. The frame structure as claimed in claim 7, wherein the adhesive layer has an adhesive shear strength equal to or greater than 3 MPa.

9. The frame structure as claimed in claim 1, wherein the filler has an adhesive shear strength equal to or greater than 3 MPa relative to one of the first and second panel members where the filler is provided.

10. The frame structure as claimed in claim 1, wherein the filler provided on one of the first and second panel members extends a predetermined distance in a direction lengthwise of the frame structure, and further comprising a partial reinforcement member disposed within the hollow of the frame structure at a position where the filler is not provided, said partial reinforcement member having one end portion adjacent the filler which is formed with an extension so as to overlap an end portion of the partial reinforcement member.

11. The frame structure as claimed in claim 10, wherein the partial reinforcement member is provided in the reinforcement disposed within the hollow between the first and second panel members.

12. The frame structure as claimed in claim 10, wherein the end portion of the partial reinforcement member opposite to the extension is jointed to a strength member.

13. The frame structure as claimed in claim 1, wherein the filler extends a predetermined distance in a direction lengthwise of the frame structure and has ends opposite to each other, said ends of the filler having a strength lower than that of an intermediate portion of the filler between the opposite ends thereof.

14. The frame structure as claimed in claim 1, wherein the filler extends a predetermined distance in a direction lengthwise of the frame structure and is provided on one of the first and second panel members which forms an outermost panel, said filler having ends opposite to each other which have an adhesive shear strength relative to such one of the first and second panel members that is smaller than that of an intermediate portion of the filler between the opposite ends thereof.

15. The frame structure as claimed in claim 1, wherein the intermediate panel member has a plurality of beads formed therein so as to extend in a direction lengthwise of the frame structure with the neighboring beads defining an expansion accommodating space communicated with the closed volume, and wherein the filler is foamed to fill up not only the closed volume, but also the expansion accommodating space.

16. An automobile bodyshell frame structure comprising:

a generally elongated first panel member;

a generally elongated second panel member having opposite side edge portions connected to the first panel member to define a hollow between the first and second panel members;

an intermediate panel member interposed between the first and second panel members so as to divide the hollow into a first closed volume adjacent the first panel member and a second closed volume adjacent the second panel member;

upper and lower dividing elements positioned on one of opposite surfaces of the intermediate panel member adjacent the first closed volume and spaced a distance from each other in a direction lengthwise of the frame structure, each of said dividing elements defining a respective gap between it and the first panel member;

a filler expanded to fill up a portion of the first closed volume that is delimited between the upper and lower dividing elements with end portions of the filler filling up the gaps between, the upper and lower dividing elements and the first panel member, said filler when not expanded yet being retained in that portion of the first closed volume delimited between the upper and lower dividing elements.

17. An automobile bodyshell frame structure comprising:

a generally elongated first panel member;

a generally elongated second panel member having opposite side edge portions connected to the first panel, member to define a hollow between the first and second panel members;

an intermediate panel member interposed between the first and second panel members so as to divide the hollow into a first closed volume adjacent the first panel member and a second closed volume adjacent the second panel member;

a first filler expanded to fill up at least a portion of the first closed volume and having ends opposite to each other; and a second filler expanded within that portion of the first closed volume and held in abutment with each of the opposite ends of the first filler, said second filler having an expand ratio higher than that of the first filler.

* * * * *